US012361089B2

(12) United States Patent
Gadit et al.

(10) Patent No.: US 12,361,089 B2
(45) Date of Patent: Jul. 15, 2025

(54) GENERATIVE SEARCH ENGINE RESULTS DOCUMENTS

(71) Applicant: Microsoft Technology Licensing, LLC, Redmond, WA (US)

(72) Inventors: Mohamed Salman Ismail Gadit, San Jose, CA (US); Andrea Jacqueline Pagotto, Ontario (CA); Shiroy Sohrab Choksey, Pleasanton, CA (US); Elbio Renato Torres Abib, Bellevue, WA (US); Nathan James Chalmers, Seattle, WA (US); Shivani Sridhar, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/537,788

(22) Filed: Dec. 12, 2023

(65) Prior Publication Data
US 2025/0190507 A1 Jun. 12, 2025

(51) Int. Cl.
*G06F 16/30* (2019.01)
*G06F 16/93* (2019.01)
*G06F 16/9538* (2019.01)

(52) U.S. Cl.
CPC .......... *G06F 16/9538* (2019.01); *G06F 16/93* (2019.01)

(58) Field of Classification Search
CPC .............................. G06F 16/9538; G06F 16/93
See application file for complete search history.

(56) References Cited

U.S. PATENT DOCUMENTS

| | | |
|---|---|---|
| 2012/0059838 A1 | 3/2012 | Berntson et al. |
| 2014/0358889 A1 | 12/2014 | Shmiel et al. |
| 2017/0097951 A1 | 4/2017 | Nachiappan et al. |
| 2024/0095460 A1* | 3/2024 | Xu .......................... G06F 40/30 |
| 2024/0202221 A1* | 6/2024 | Siebel ...................... G06N 20/00 |
| 2024/0220735 A1* | 7/2024 | Gray ....................... G06F 40/40 |
| 2024/0256582 A1* | 8/2024 | Jain ..................... G06F 16/3329 |
| 2024/0289395 A1* | 8/2024 | Zhou ................... G06F 16/9532 |
| 2024/0289407 A1* | 8/2024 | Rofouei .............. G06F 16/9577 |

FOREIGN PATENT DOCUMENTS

AU 2019201531 B2 8/2021

OTHER PUBLICATIONS

International Search Report and Written Opinion received for PCT Application No. PCT/US2024/055290, Feb. 27, 2025, 15 pages.

\* cited by examiner

*Primary Examiner* — Khanh B Pham
(74) *Attorney, Agent, or Firm* — Ray Quinney & Nebeker; Chris Hallstrom

(57) ABSTRACT

This disclosure describes utilizing a generative document system to dynamically build and provide generative search result documents. The generative document system utilizes an aggregated framework that leverages one or more large generative models (LGMs). For example, the aggregated framework includes three stages where local processes are applied to generative outputs from LGMs, with each stage building upon the generative inputs from previous stages. The generative document system uses the aggregated framework to create generative search result documents based on search queries and their corresponding search result links. These generative search result documents provide interactive, intuitive, comprehensive, and flexible curation of answers that address the respective search queries.

20 Claims, 12 Drawing Sheets

GENERATIVE SEARCH ENGINE RESULTS DOCUMENTS

BACKGROUND

In recent years, there have been significant advancements in both hardware and software domains, specifically in the field of Internet search. Current systems are designed to retrieve and present lists of links and resources in response to user search queries. These systems also offer direct answers for frequently searched topics. However, as the number of accessible resources continues to grow, existing systems still have limitations in providing useful and relevant answers without requiring significant user effort. For instance, users often have to manually examine lists of results and review multiple entries before finding a satisfactory answer. Sometimes, users find a direct answer on search results and the full list of results on the web page are rendered unhelpful. These and other issues are present in current search result systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
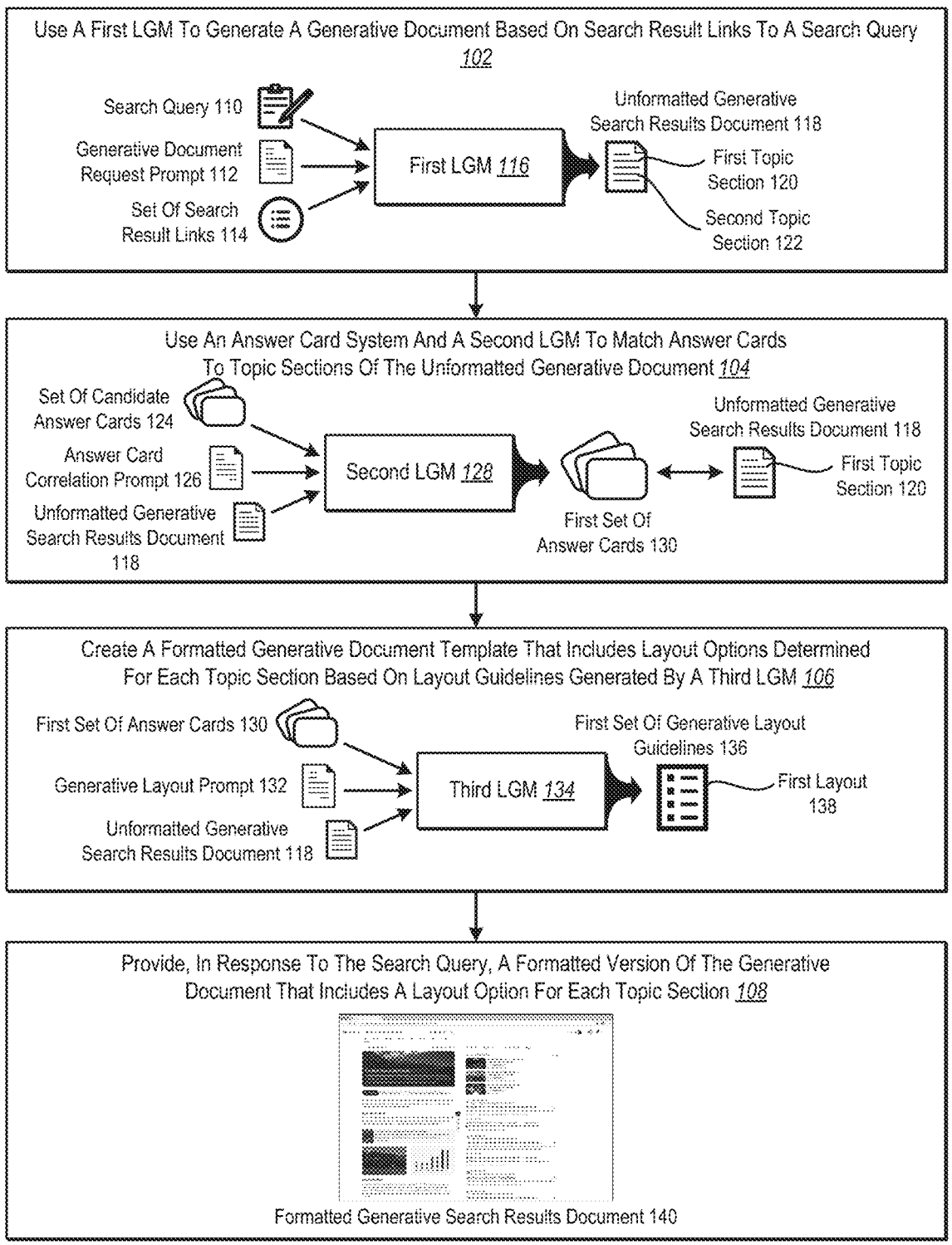
FIG. 1 illustrates an example overview of the generative document system using large generative models to create a generative search results document for a search query.

This disclosure describes utilizing a generative document system to dynamically build and provide generative search result documents using an aggregated framework that leverages one or more large generative models (LGMs). For example, the aggregated framework includes three stages where local processes are applied to generative outputs from LGMs, with each stage building on the generative inputs from previous stages. The generative document system uses the aggregated framework to create generative search result documents based on search queries and corresponding search result links. These generative search result documents provide an interactive, intuitive, wide-ranging, and flexible curation of answers that address the corresponding search queries.

Implementations of the present disclosure provide benefits and solve problems in the art with systems, computer-readable media, and computer-implemented methods that utilize the generative document system to curate and build generative documents from search result links using one or more LGMs. As described below, the generative document system provides an aggregated framework that utilizes one or more LGMs to leverage different output types to build a dynamic and interactive generative document to be provided along with search result links, where the generative document intelligently curates the search result information into a streamlined and understandable format.

As mentioned above, the generative document system creates generative search result documents (generative documents). To illustrate, in various implementations, in response to receiving a search request from a user and obtaining a set of search result links, the generative document system generates and provides a generative document request prompt and the search result links to a first LGM, which generates an unformatted generative document with topic sections having text narrative responses corresponding to links in the search result links. In response to providing a second LGM with an answer card correlation prompt, topic sections, and sets of candidate answer cards for the topic sections, the generative document system receives a first set or list of answer cards for each topic section.

Furthermore, the generative document system provides a third LGM with a generative layout prompt and available layout options. In response, the generative document system receives generative layout guidelines for each topic section, where the layouts visually position the text narrative response with combinations of answer cards for each topic section. Additionally, the generative document system generates a formatted generative document that includes the layouts for the topic sections and provides it to the client device that requested the search query.

As described in this disclosure, the generative document system delivers several significant technical benefits in terms of improved accuracy, efficiency, and flexibility compared to existing search result systems. Moreover, the generative document system provides several practical applications that address problems related to providing search results in response to search queries.

To better understand the technical benefits of the generative document system, consider existing search result systems. For example, in response to a user's web search query, existing search result systems often display responses in the form of a Search Engine Results Page (SERP), which includes a set or list of results that are most relevant to the search query. In their early stages, search result systems simply provided a series of hyperlinks correlated with the user's search terms in a SERP. Currently, however, existing search result systems provide SERPs that also include direct responses to frequently queried subjects. Despite these advancements, current systems face technical challenges.

As mentioned earlier, the generative document system creates generative documents that provide streamlined, dynamic, and comprehensible answers to search queries. In various implementations, generative documents include accurate and efficient curations of search result links, which are presented alongside the generative documents. In various implementations, the generative document system creates improved SERPs that include a generative document and corresponding search result links.

By using LGMs to build generative documents from search result links for a search query, the generative document system improves the accuracy and efficiency of providing search results. For example, the generative document system uses LGMs to generate text narrative responses from the search result links in an unformatted generative document that is divided into topics associated with the search query. The generative document system then matches the text narrative responses to curated answer cards that provide targeted and interactive answers. Further, the generative document system generates layout guidelines for formatting the generative document into a logical and readable arrangement. In addition to including the text narrative responses paired with relevant answer cards that reference the search result links, the formatted generative document can be presented alongside the search result links for efficient navigation.

As mentioned, the generative document system provides an aggregated framework that builds upon the outputs of multiple calls or prompts to one or more LGMs, where the different prompts produce different output formats. In some instances, the generative document system calls multiple LGMs with different prompts. In some implementations, the generative document system prompts the same LGM with different prompts to generate different output formats (e.g., unformatted generative documents, lists of correlated answer cards, and layout guidelines). The generative document system efficiently leverages different features and functions of LGMs to create outputs that can be compounded to improve accuracy at each stage and efficiently build a highly dynamic, streamlined, and useful generative document in response to a search query.

In various implementations, the generative document system improves efficiency by reutilizing generative documents for recurring search result lists. For example, a generative document is created based on a set of search result links retrieved in response to a search query. When the same or a similar search query is repeated, by the same or another user, and results in the same or similar set of search result links, the generative document system can efficiently and accurately reuse the same generative document without making multiple calls to one or more LGMs. When the set of search results differs beyond a threshold amount, and by using external real-time signals like news, stock tickers, weather, etc., the generative document system can update the generative document to ensure accurate results are provided in response to a search query.

The generative document system also provides flexibility over existing systems. As mentioned earlier, the generative document system leverages different features of one or more LGMs to generate multiple output formats. As part of this flexibility, the generative document system uses LGM outputs from earlier steps as LGM inputs in later steps to skillfully create elements needed to build the final formatted generative document. As another part of this flexibility, the generative document system can provide different prompts to the same LGM to generate different LGM output types or be provided to different LGMs.

As illustrated in the preceding discussion, this disclosure uses a variety of terms to describe the features and advantages of one or more described implementations. For instance, this disclosure describes the generative document system within the context of a cloud computing system.

As an example, a "large generative model" (LGM) is a large artificial intelligence system that utilizes deep learning and a large number of parameters (e.g., in the billions or trillions) that are trained on one or more extensive datasets to produce coherent, contextually relevant, and fluently topic-specific outputs (e.g., text and/or images). In many instances, a generative model refers to an advanced computational system that uses natural language processing, machine learning, and/or image processing to generate coherent and contextually relevant human-like responses.

Large generative models have applications in natural language understanding, content generation, text summarization, dialog systems, language translation, creative writing assistance, image generation, audio generation, and more. A single large generative model often performs a wide range of tasks by receiving different inputs, such as prompts (e.g., input instructions, rules, example inputs, example outputs, and/or tasks), data, and/or access to data. In response, the large generative model generates various output formats ranging from one-word answers to long narratives, images and videos, labeled datasets, documents, tables, and presentations.

Moreover, large generative models (LGMs) are primarily based on transformer architectures to understand, generate, and manipulate human language. LGMs can also use other types of architecture types such as recurrent neural network (RNN) architecture, long short-term memory (LSTM) model architecture, convolutional neural network (CNN) architecture, or other architecture types. Examples of LGMs include generative pre-trained transformer (GPT) models such as GPT-3.5 and GPT-4, bidirectional encoder representations from transformers (BERT) model, text-to-text transfer transformer models like T5, conditional transformer language (CTRL) models, and Turing-NLG. Other types of large generative models include sequence-to-sequence models (Seq2Seq), vanilla RNNs, and LSTM networks. In some instances, an LGM includes a large language model (LLM), which serves as a text-based version of an LGM, such as an LGM that receives text prompts and/or generates text outputs. In various implementations, an LGM is a multi-modal generative model that receives multiple input formats (e.g., text, images, video, data structures) and/or generates multiple output formats.

As an example, the terms "LGM prompt" or "prompt" refer to a request provided to a large generative image model to create a generative LGM output based on a plain language guidance prompt. In some instances, the generative document system provides additional information with a prompt. A prompt can include a user-level prompt that includes a user request or a system-level or meta-level prompt that provides important context information and/or general framing information to ensure that the LGM understands the correct context, syntax, and grounding information of the data it is processing. Examples of prompts include a generative document request prompt that includes instructions to an LGM to generate an unformatted generative search results document with topic sections, an answer card correlation prompt that includes instructions to an LGM to generate one or more lists of answer cards that correlate to topic sections of the unformatted generative document, and a generative layout prompt that includes instructions to an LGM to generate layout guidelines for guiding the generative document system to generate layouts that include text narrative responses and a combination of correlated answer cards.

As an example, the term "search link results" refers to links (e.g., hyperlinks) and their corresponding resources that are obtained in response to a search query (e.g., a user-requested search query). In various implementations, providing search link results to an LGM enables the model to access resources, summaries, and/or metadata associated with the links. In various implementations, a set of search link results includes a ranked order of results based on scores given to each result according to its correlation with a search query. Search link results can include any number of results corresponding to a search query.

As an example, the term "generative search result document" (or generative document) refers to a search-based document that includes text narrative responses corresponding to a search query and its corresponding set of search result links. In many implementations, a generative document includes topic sections that correspond to a search query and a set of search result links based on the search query. For example, topic sections include responses that answer portions of a search query. A generative document can include an unformatted generative document that includes bodies of text narrative responses (e.g., text responses written in a plain language narrative) laid out in one or more topic sections (e.g., no answer cards or grid layout properties). A generative document can include a formatted generative document that includes visual layouts for each topic section that visually arranges text narrative responses with combinations of answer cards, often within a grid-based or list-based structure. In some implementations, a generative document is part of a search engine results page (SERP) along with a corresponding set or list of search result links.

As another example, the term "answer card" refers to an element that provides direct answers to a search query or sub-queries derived from the search query. Answer cards provide quick, accurate answers to questions without requiring further search or interaction by a user. Answer cards can include text, images, audio, video, and/or animations to convey a quick answer. In addition, answer cards may include various versions that include different granularities of information and/or have different layout dimensions (e.g., available dimensions). Furthermore, answer cards include metadata and/or other grounding information to allow an LGM to understand the context associated with the card.

As an example, the term "layout" refers to the visual arrangement of text and/or elements, such as answer cards within a generative document. While an unformatted generative document may include topic sections, it does not include a layout of text and elements. In some instances, a layout is defined by a grid and/or coordinate system that allocates one or more grid spaces (e.g., blocks) for text or elements. In various implementations, a layout template provides one or more possible layouts for a generative document or a portion of a generative document (e.g., for a topic section). Also, as an example, the term "layout guidelines" refers to a set of recommendations, rules, hints, and/or suggestions for arranging the text narrative response in a topic section with one or more correlated answer cards.

Additionally, as an example, a "network" refers to one or more data links that enable electronic data transport between computer systems, modules, and/or other electronic devices. A network may include public networks such as the Internet as well as private networks. When information is transferred or provided over a network or another communications connection (either hardwired, wireless, or a combination of hardwired and wireless) to a computer, the computer views the connection as a transmission medium. Transmission media can include a network and/or data links that can be used to carry the needed program code means in the form of computer-executable instructions or data structures and which can be accessed by a general-purpose or special-purpose computer. Combinations of the above are also included within the scope of computer-readable media.

Implementation examples and details of the generative document system are discussed in connection with the accompanying figures, which are described next. For example, FIG. 1 illustrates an overview of the generative document system using large generative models to create a generative search results document for a search query according to some implementations. While FIG. 1 provides a high-level overview of the invention, additional details are provided in subsequent figures.

FIG. 1 illustrates a series of acts 100 performed by or with the generative document system. As shown, the series of acts 100 briefly illustrates an example of how the generative document system uses an aggregated framework with different LGMs to generate outputs that are used in subsequent LGM prompts. These LGM outputs are combined to build or create a formatted generative search results document (generative document).

As shown, the series of acts 100 includes act 102 of using a first LGM to generate a generative document based on search result links to a search query. For example, in response to receiving a search query 110 from a user, the generative document system uses it to obtain a set of search result links 114. The generative document system provides a generative document request prompt 112, the search query 110, and the set of search result links 114 to a first LGM 116, which generates an unformatted generative search results document 118 having a first topic section 120, a second topic section 122, and/or other topic sections. The topic sections are information synthesis of the set of search result links 114, organized by topic. Additional details regarding generating unformatted generative documents are provided below in connection with FIGS. 3A and 3B.

As shown, act 104 includes using an answer card system and a second LGM to match answer cards to topic sections of the unformatted generative document. For example, the generative document system obtains a set of candidate answer cards 124 from an answer card system for each of the topic sections. The generative document system provides an answer card correlation prompt 126, the unformatted generative search results document 118, and one or more sets of candidate answer cards for one or more topic sections to a second LGM 128, which generates a set or list of answer cards that match a topic section (or a portion within a topic section). For instance, the second LGM 128 generates a first list or set of answer cards 130 that correlates to the first topic section 120 within the unformatted generative search results document 118. Additional details regarding the generation of lists of answer cards that correlate to the topic sections are provided below in connection with FIGS. 4A and 4B.

Act 106 includes creating a formatted generative document template that includes layout options determined for each topic section based on layout guidelines generated by a third LGM. For example, the generative document system provides the first list or set of answer cards 130, a generated layout prompt 132, and the unformatted generative search results document 118 to a third LGM 134 to generate a first list or set of generative layout guidelines 136. Based on the first list or set of generative layout guidelines 136, the generative document system generates layout options for the first topic section such as the first layout 138 shown (and repeats for the other topic sections). The generative document system then combines the various layout options for each topic section into a formatted generative document template. Additional details regarding the generation of layout guidelines for topic sections are provided below in connection with FIGS. 5A and 5B.

As shown, act 108 includes providing, in response to the search query, a formatted version of the generative document that includes a layout option for each topic section. For example, the generative document system selects the top available layout option for each section from the formatted generative document template to generate the formatted generative search results document 140. The generative document system then provides the formatted generative search results document 140 to the client device that submitted the search query. In some instances, the generative document system stores and/or accesses the formatted generative search results document 140. Additional details regarding generating formatted generative search result documents are provided below in connection with FIGS. 5A, 5B, and 6. FIG. 7 provides a visual example of a formatted generative search results document 140.

Figure 2:
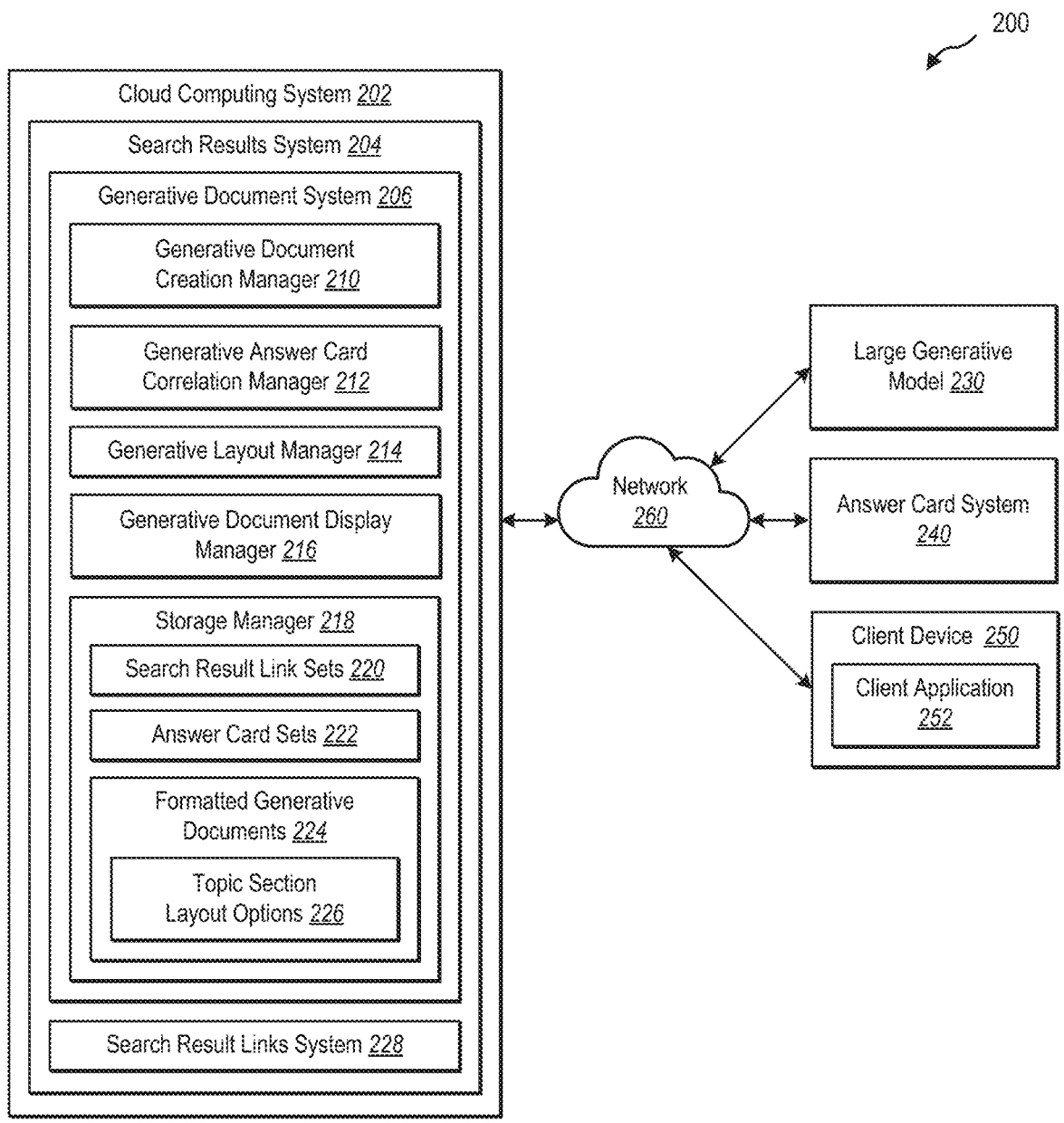
FIG. 2 illustrates an example computing environment where the generative document system is implemented.

With a general overview in place, additional details are provided regarding the components, features, and elements of the generative document system. To illustrate, FIG. 2 shows an example computing environment where the generative document system is implemented according to some implementations. In particular, FIG. 2 illustrates an example of a computing environment 200 of various computing devices including a cloud computing system 202 associated with a generative document system 206. While FIG. 2 shows example arrangements and configurations of the computing environment 200, the cloud computing system 202, the generative document system 206, and associated components, other arrangements and configurations are possible.

As shown, the computing environment 200 includes a cloud computing system 202 associated with the generative document system 206, a large generative model 230, an answer card system 240, and a client device 250 with a client application 252, connected via a network 260. Many of these components may be implemented on one or more computing devices, such as on one or more server devices. Some of these components may be implemented on a personal device. Further details regarding computing devices are provided below in connection with FIG. 9, along with additional details regarding networks, such as the network 260 shown.

Before describing components of the cloud computing system 202 including the generative document system 206, other components of the computing environment 200 are first discussed to provide better context when discussing the generative document system 206. As shown, the computing environment 200 includes the large generative model 230 (LGM), which creates generative outputs (e.g., LGM outputs) of various types and/or formats, and prompt inputs (e.g., LGM inputs). For example, the large generative model 230 generates unformatted generative search results document 118, a first list or set of answer cards 130, and a first list or set of generative layout guidelines 136 in response to different prompts. The large generative model 230 represents a single LGM or a set of multiple LGMs.

As shown, the computing environment 200 includes the answer card system 240, which receives answer card requests and returns lists of candidate answer cards corresponding to a search query, topic, or a portion of a search query. In various implementations, a list or set of candidate answer cards is ranked according to quality, engagement, or another metric. In some instances, the answer card system provides properties, such as display sizes, dimensions, media types, rendering metadata, and/or grounding data for one or more answer cards.

As shown, the computing environment 200 includes the client device 250. In various implementations, the client device 250 is associated with a user (e.g., a user client device), such as a user who requests a search query. In various instances, the client device 250 includes a client application 252, such as a web browser, mobile application, or another form of computer application for accessing and/or interacting with the cloud computing system 202 and/or the generative document system 206. For example, the client device 250 interacts with generative content (e.g., text narrative responses and corresponding answer cards) within a formatted generative search results document via the client application 252.

Returning to the cloud computing system 202, as shown, the cloud computing system 202 includes a search results system 204 and a search result links system 228. In various implementations, the search result links system 228 returns a set of search result links in response to a search request. In various implementations, a set of search results includes one or more ranked search result links.

In various implementations, the search results system 204 provides search results in response to a search query. For example, the client device 250 submits a search request and the search results system 204 returns a formatted generative search results document generated by the generative document system 206 and/or a set of search result links provided by the search result links system 228.

As shown, the search results system 204 implements the generative document system 206. In some implementations, the generative document system 206 is located on a separate computing device from the search results system 204 within the cloud computing system 202 (or apart from the cloud computing system 202). In various implementations, the search results system 204 operates without the generative document system 206.

In various implementations, including the illustrated implementation, the generative document system 206 includes various components and elements that are implemented in hardware and/or software. For example, the generative document system 206 includes a generative document creation manager 210, a generative answer card correlation manager 212, a generative layout manager 214, a generative document display manager 216, and a storage manager 218. The storage manager 218 includes search result link sets 220, answer card sets 222, formatted generative documents 224, and topic section layout options 226.

As mentioned above, the generative document system 206 includes the generative document creation manager 210, which communicates with the search result links system 228 to obtain one or more of the search result link sets 220 for a search query (and sub-queries in some cases). In addition, the generative document creation manager 210 communicates with the large generative model 230 to generate unformatted generative documents.

The generative document system 206 also includes the generative answer card correlation manager 212, which communicates with the answer card system 240 to obtain candidate sets of answer cards corresponding to a search query and/or an unformatted generative document. The generative answer card correlation manager 212 also communicates with the large generative model 230 to obtain answer card sets 222 from the candidate sets of answer cards for topic sections within the unformatted generative document.

The generative document system 206 includes the generative layout manager 214, which communicates with the large generative model 230 to generate layout guidelines for topic sections within the unformatted generative document, where the layout guidelines correlate answer cards to text narrative responses within a topic section. In various implementations, the generative layout manager 214 also determines various layout options for each topic section (e.g., generates topic section layout options 226) based on the generative layout guidelines.

The generative document system 206 includes the generative document display manager 216, which builds formatted generative documents 224 from the topic section layout options 226 (e.g., from formatted generative document templates). For instance, the generative document system 206 determines an available layout option for each section within a formatted generative document template, which is then provided to the client device 250 in response to the search query. In some instances, the generative document display manager 216 provides a search engine results page (SERP) to the client device 250 that includes a formatted generative document and a set of search result links in response to receiving a search query.

Turning to the next set of figures, FIGS. 3A-3B, 4A-4B, 5A-5B, and 6 illustrate example sequence diagrams that focus on different interactions between the generative document system 206 and one or more LGMs to build a generative document. In part, these figures show different communications between the generative document system 206, the search result links system 228, the large generative model 230, the answer card system 240, and the network 260.

Figure 3A:
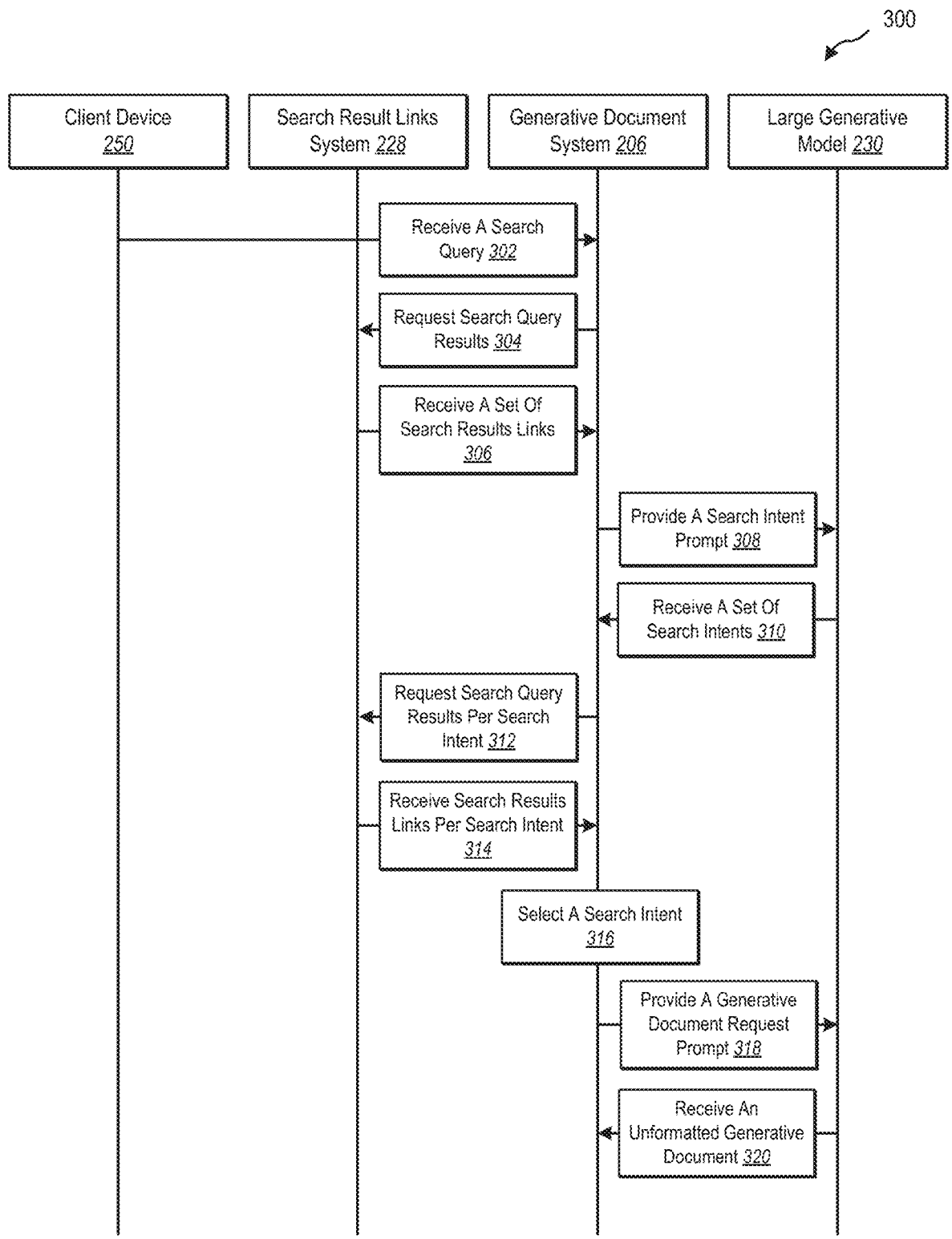
FIG. 3A illustrates an example sequence diagram of using a large generative model to generate an unformatted generative document.

To begin, FIG. 3A illustrates an example sequence diagram of using a large generative model to generate an unformatted generative document according to some implementations. As shown, FIG. 3A includes a series of acts 300 performed by or with the generative document system 206. In some implementations, the series of acts 300 may include fewer or different acts (e.g., some of the acts may be skipped or omitted). Additionally, in some instances, the acts in the series of acts 300 are performed in a different order.

As shown, the series of acts 300 begins with act 302 of the generative document system 206 receiving a search query from the client device 250. For example, based on a user's interaction, the client device 250 sends a search query requesting search results for a topic or question. For instance, the user enters a search question into the search field of a search engine via a web browser.

Act 304 shows the generative document system 206 requesting search query results from the search result links system 228. In response, the search result links system 228 provides the generative document system 206 with a set or list of links to websites and/or resources corresponding to the search query. As shown, act 306 includes the generative document system 206 receiving a set of search query results from the search result links system 228. In some implementations, the search query is directly provided to the search result links system 228, which then provides the search result links to the generative document system 206.

In some implementations, the search result links system 228 determines and provides additional information corresponding to the search result. For example, for frequently searched queries, the search result links system 228 provides general answers. In some instances, the search result links system 228 also provides answer snippets from the search result links and/or other knowledge base sources.

Act 308 shows the generative document system 206 providing a search intent prompt to the large generative model 230. In various implementations, the search intent prompt provides instructions to the large generative model 230 to analyze the search query, generate a set or list of candidate intents behind the search query, rank the list, and return one or more intents from the list. To illustrate, act 310 shows the generative document system 206 receiving a set or list of search intents from the large generative model 230.

In some implementations, the generative document system 206 also provides additional information to the large generative model 230 along with the search query. For example, the generative document system 206 provides some or all of the links from the set of search result links. As another example, the generative document system 206 also provides previous user search queries, previous user interactions, user preferences and information, and/or session or state information.

Act 312 shows the generative document system 206 requesting search query results per/for each search intent. In various implementations, the generative document system 206 obtains a set of search result links for one or more of the search intents. The generative document system 206 may send separate requests for different intents or make a combined request. The search result links system 228 may generate and return search result links for each request. To illustrate, act 314 shows the generative document system 206 receiving search result links per/for each search intent.

The series of acts 300 includes act 316 of the generative document system 206 selecting a search intent. In various implementations, the generative document system 206 also selects one or more search intents using a search intention selection model (which may use various methods including LGMs). In some implementations, the series of acts 300 omits this step or uses a default selection process to select a search intent.

Act 318 shows the generative document system 206 providing a generative document request prompt to the large generative model 230. In various implementations, the generative document request prompt includes instructions to generate an unformatted generative document that corresponds to the set of search result links associated with the search query provided by the client device 250. For example, the generative document request prompt instructs the large generative model 230 to synthesize the set of search result links and corresponding resources individually and collectively, determine a set or list of topics (e.g., building-block information pieces or questions) that correspond to the search query, generate text narrative responses for each topic, and cite the text narrative responses back to one or more of the search result links. In some instances, synthesizing includes collating information from one or more of the search result links into a text narrative response, list, or chart.

In some implementations, the generative document request prompt includes system-level prompt instructions, such as establishing a context (e.g., "You are a data analyst who discovers connections between websites and writes comprehensive summaries") and/or ensuring responsible artificial intelligence (AI). In some instances, the generative document request prompt includes an output type. The generative document request prompt may also include example outputs of a sample search query and sample unformatted generative document with example topic sections.

In various implementations, the generative document system 206 also provides one or more search intents along with their corresponding search request links. In these instances, the generative document request prompt instructs the large generative model 230 to also consider the additional links of lists when generating topic sections and text narrative responses as part of the unformatted generative document.

As shown, act 320 shows the network 260 receiving an unformatted generative document. As provided above, in many implementations, an unformatted generative document refers to a text-based generative document that includes one or more sections (e.g., topic sections) each having a corresponding text narrative response that provides a generative synthesizes of information in the set or list of search results. In a few instances, the unformatted generative document may include images or other graphics included inline in a topic section. That is, an unformatted generative document does not include answer cards or visual layouts between sections or content within sections.

As mentioned earlier, the unformatted generative document is based on one or more lists of search result links and includes citations to some of the result links. In various implementations, the generative document system 206 re-orders or re-ranks the order of links based on their appearance within the generative document. This may result in dropping an originally high-ranked result link down in rank order so that it is not initially displayed in the search result links displayed with the generative document. Indeed, the generative document system 206 may affect which search result links (and their order) are displayed in a SERP.

Figure 3B:
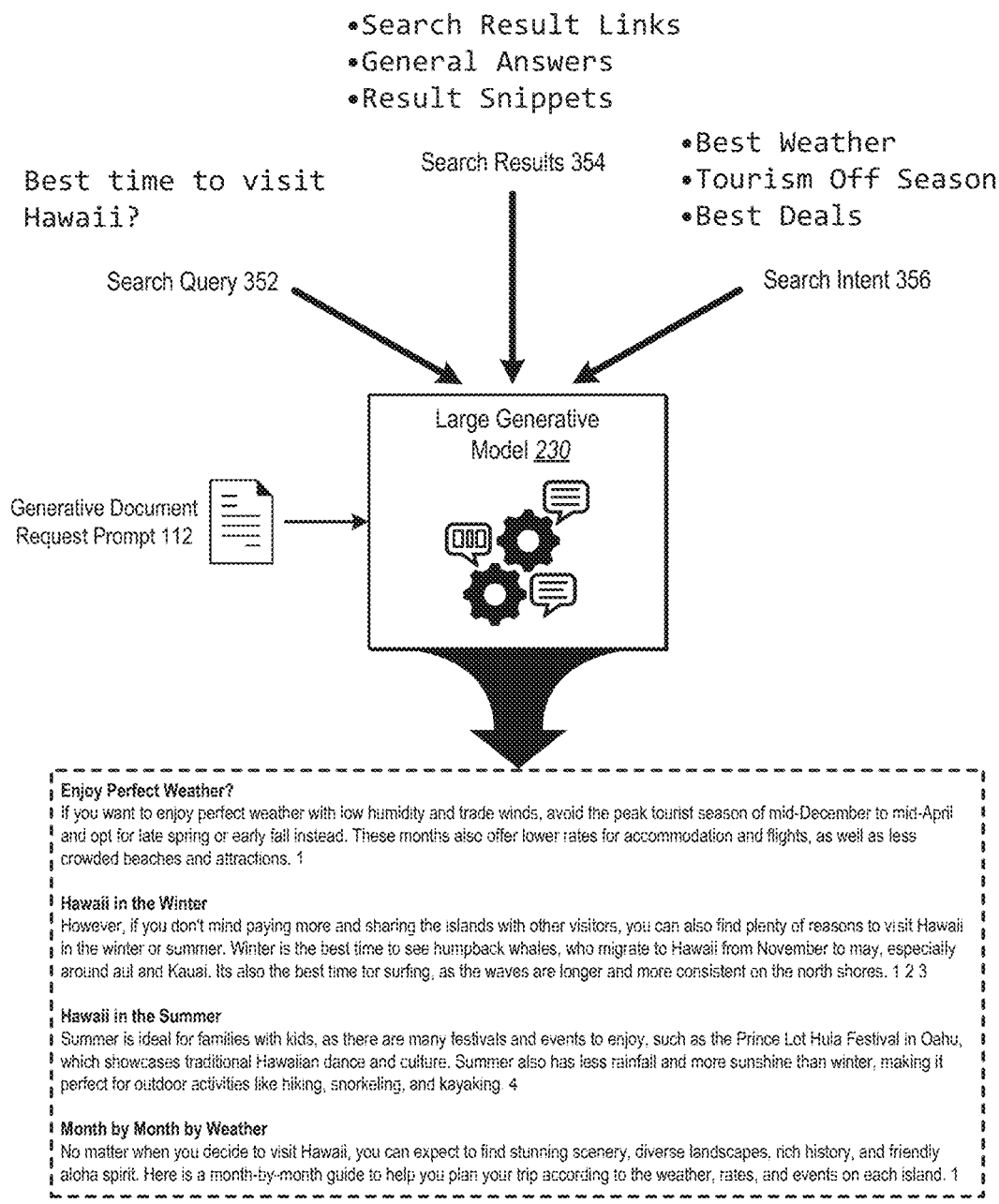
FIG. 3B illustrates an example of generating an unformatted generative document.

FIG. 3B illustrates an example of generating an unformatted generative document according to some implementations. FIG. 3B provides examples of various elements and outputs corresponding to generating an unformatted generative document. As shown, FIG. 3B includes a series of acts 350 performed by the generative document system 206 to generate an unformatted generative document using the large generative model 230.

The series of acts 350 includes the generative document system 206 providing a search query 352, search results 354, and a search intent 356. As shown, the search query 352 requests the best time to visit Hawaii. The search intent 356 determines various intents for this search query, such as the best time in terms of weather, cost, business, etc. The search results 354, which are generated by the search result links system 228, include search result links, general answers, result snippets, etc., as described above.

As also shown, the generative document system 206 provides the generative document request prompt 112 to the large generative model 230 with instructions to generate an unformatted generative document from the provided inputs. In response, the large generative model 230 generates the unformatted generative search results document 360. As shown, the unformatted generative search results document 360 includes topic sections that each include a text narrative response along with citations to the links used to generate the narrative. In particular, the topic sections show different aspects of the weather in Hawaii, which may correspond to a search intent of finding the best time to visit Hawaii in terms of the weather.

Figure 4A:
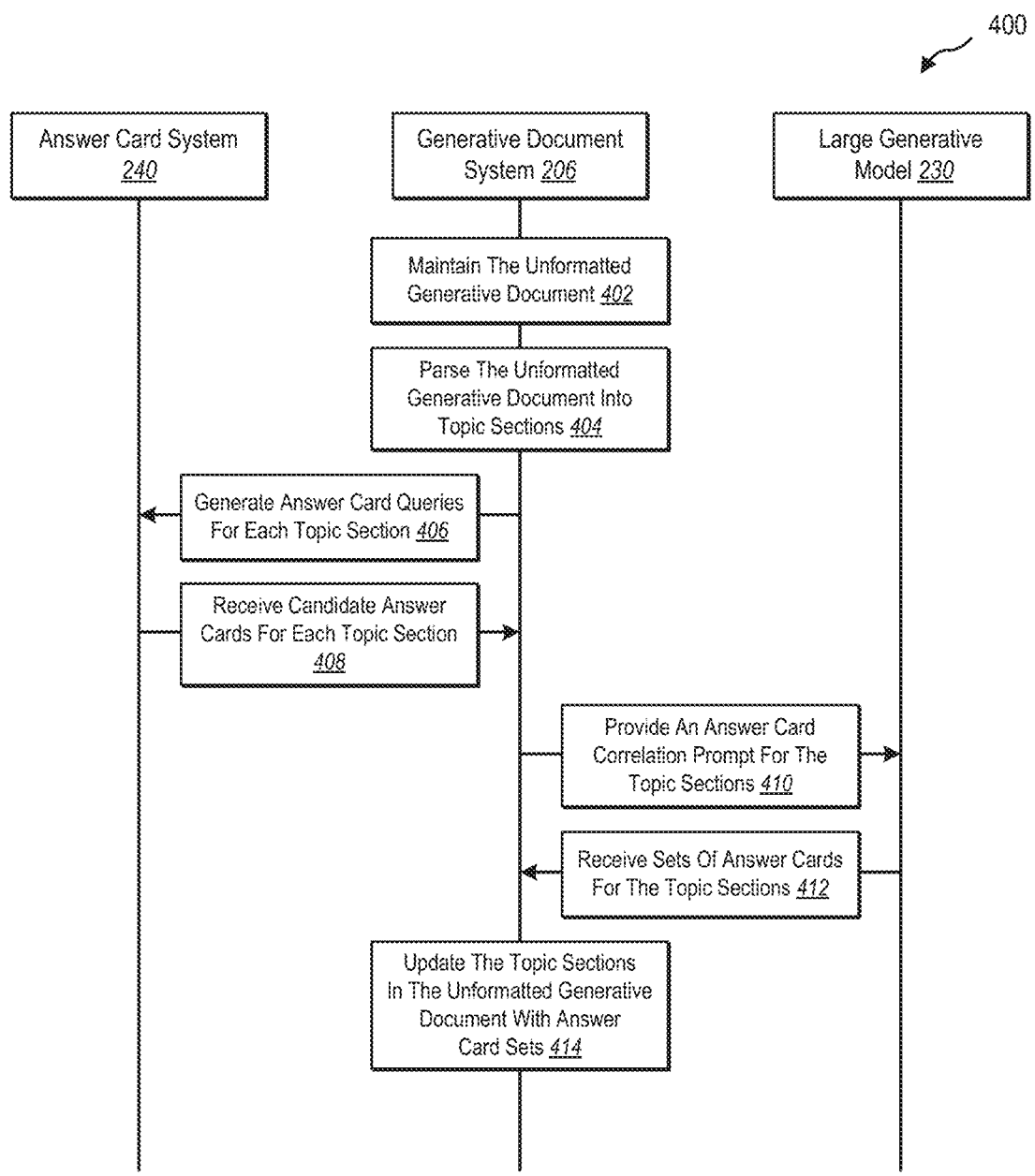
FIG. 4A illustrates an example sequence diagram of using a large generative model to determine answer card matches.

FIG. 4A illustrates an example sequence diagram of using a large generative model to determine answer card matches according to some implementations. As shown, FIG. 4A includes a series of acts 400 performed by or with the generative document system 206. In some implementations, the series of acts 400 may include fewer or different acts (e.g., some of the acts may be skipped or omitted). Additionally, in some instances, the acts in the series of acts 400 are performed in a different order.

As shown, the series of acts 400 begins with act 402 of the generative document system 206 maintaining the unformatted generative document. As previously described in connection with FIG. 3A, the generative document system 206 generates the unformatted generative document using the large generative model 230. In some instances, the series of acts 400 omits act 402.

Act 404 shows the generative document system 206 parsing the unformatted generative document into topic sections. In various implementations, because the generative document is unformatted, the generative document system 206 divides the generative document into topic sections. In some instances, the generative document system 206 generates sub-generative documents for each topic section.

Act 406 shows the generative document system 206 generating answer card queries for each topic section. For example, upon parsing or separating the generative document into topic sections, the generative document system 206 generates an answer card query (e.g., an answer recall query) for each section. In some instances, an answer card query requests that the answer card system 240 identify potential answer cards for content included in the request (e.g., the topic section). Accordingly, the generative document system 206 may send multiple answer card queries to the answer card system 240 for the different topic sections.

In some implementations, the search result links system 228 performs fan-out searches to gather all potential answer cards that match the generative document. For example, consider a search query, a topic section, a results link, a text narrative response, or a portion thereof that provides the input, "Snorkeling in Maui is best in July." In this example, along with the query of "snorkeling in Maui in July," the search result links system 228 may break this input down into a first sub-query of "Maui," a second sub-query of "Maui in July," and a third sub-query of "snorkeling in Maui." The search result links system 228 searches for candidate answer cards based on each of the fan-out queries.

In various implementations, the search result links system 228 also provides metadata along with the answer cards. For example, the search result links system 228 indicates whether an answer card has multiple versions. For instance, an answer card may include multiple layouts, grid layout dimensions, granularity levels, and/or resolutions. In addition, an answer card includes grounding data (e.g., the card is self-grounded). In some cases, the candidate answer cards are ranked and/or scored based on their quality and/or correlation to a topic section.

As shown in act 408, the generative document system 206 receives candidate answer cards for each topic section. For example, the answer card system 240 determines a set or set or list of possible answer cards for each topic and provides one or more of the answer cards as candidates. Additionally, in some implementations, the generative document system 206 removes duplicate and/or similar answer cards for a topic section and/or the unformatted generative document.

Act 410 shows the generative document system 206 providing an answer card correlation prompt to the large generative model 230 for the topic sections. In various implementations, the generative document system 206 provides an answer card correlation prompt for a given topic section along with the candidate answer cards for the given topic section. The generative document system 206 may provide separate answer card correlation prompts for each topic section (e.g., in parallel to multiple LGM instances) or a combined prompt for multiple topic sections. If separate prompts are used, the generative document system 206 may send a final prompt requesting that the large generative model 230 combine the separate LGM outputs.

An answer card correlation prompt can provide instructions to the large generative model 230 to select a set of answer cards for a topic section from a corresponding set of candidate answer cards. In some instances, the answer card correlation prompt instructs the large generative model 230 to match one or more answer cards to portions of the text narrative response of a topic section. In various implementations, the answer card correlation prompt includes system-level prompts. In one or more implementations, the answer card correlation prompt provides scoring criteria for evaluating or scoring the strength of matches between an answer card and some or all of a text narrative response.

In some implementations, the generative document system 206 provides additional input to the large generative model 230. For example, the generative document system 206 also provides the unformatted generative document that was the output of a previous call to the large generative model (LGM). This way, the large generative model 230 builds upon previous LGM calls to achieve improved efficiency and accuracy gains over existing systems. In some implementations, the scoring criteria are provided as a separate input document.

In various implementations, the large generative model 230 generates a ranked set or list of answer card matches for each section from the corresponding set of answer cards. The large generative model 230 may determine one or more matches for a topic section as a whole or portions of the text narrative response within a section.

In some implementations, the large generative model 230 scores each match using the scoring criteria to indicate the strength of correlation for an answer card match. For example, for a topic section about the best time to visit Hawaii in February, the large generative model 230 assigns a first score to an answer card that mentions Hawaii weather in February, a second score to an answer card that books flights to Hawaii, and a third score to an answer card that books flights to Hawaii specifically in February. In this example, the first answer card would have the lowest score while the third answer card would have the highest score.

Act 412 shows the generative document system 206 receiving lists of answer cards for the topic sections. For example, for a topic section, the large generative model 230 provides the lists of answer cards selected from the corresponding candidate answer cards along with the location where each answer card matches within the topic section. In various implementations, the large generative model 230 does not return any layouts, layout suggestions, or visual arrangements when providing the lists of answer cards per topic section.

Act 414 shows the generative document system 206 updating the topic sections in the unformatted generative document with answer card lists. For example, the generative document system 206 starts creating a generative document template that links answer cards with the relevant topic sections. In various implementations, the answer cards include visual information (e.g., available grid layout sizes and dimensions) to be utilized later on by the generative document system 206.

Figure 4B:
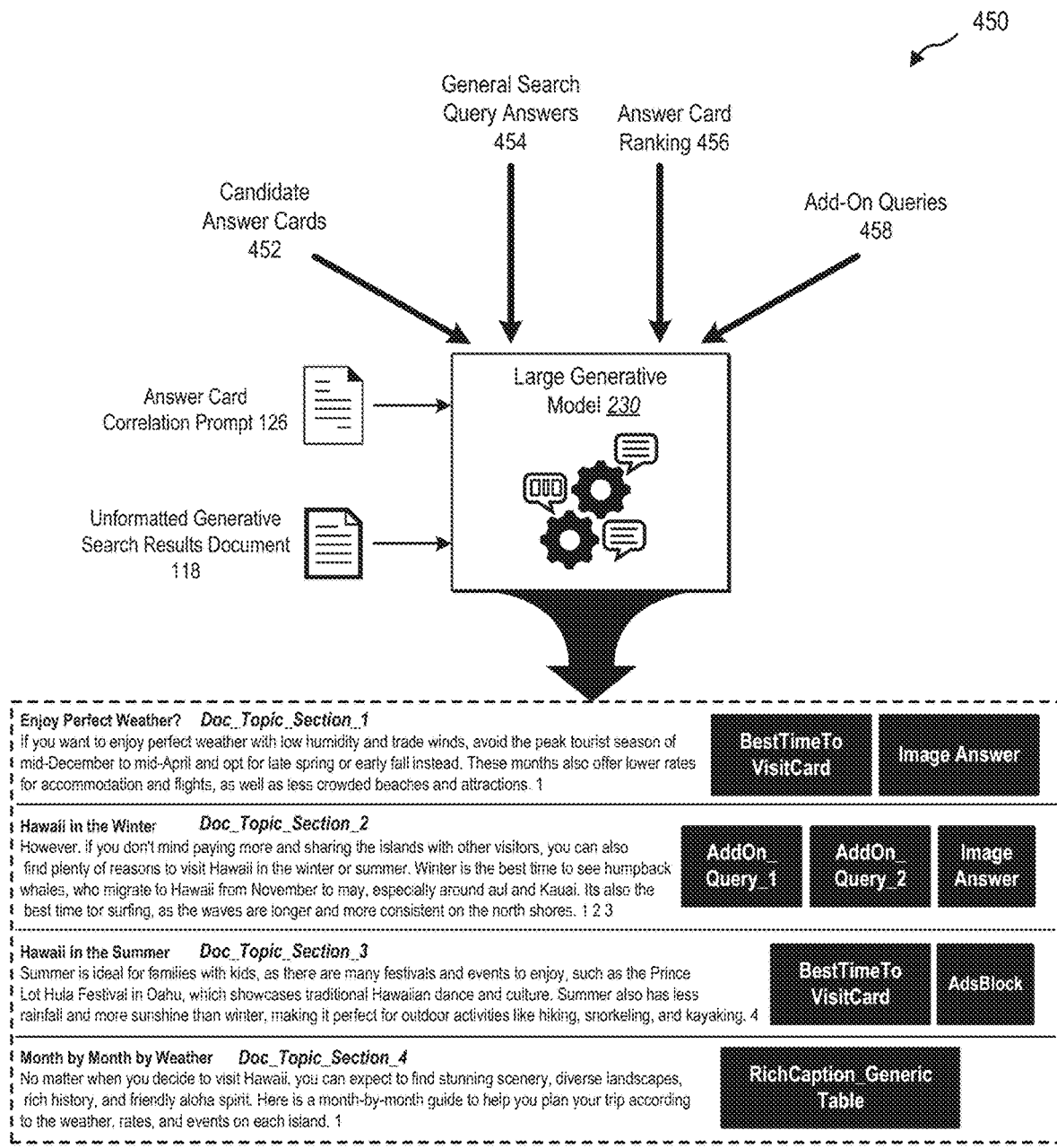
FIG. 4B illustrates an example of generating answer card matches for a topic section.

FIG. 4B illustrates an example of generating answer card matches for a topic section according to some implementations. FIG. 4B provides examples of various elements and outputs corresponding to generating an unformatted generative document. As shown, FIG. 4B includes a series of acts 450 performed by the generative document system 206 to generate answer card matches using the large generative model 230.

The series of acts 450 in FIG. 4B includes the generative document system 206 providing various inputs to the large generative model 230. As shown, the generative document system 206 provides candidate answer cards 452 obtained from an answer card system, as described above. The inputs also include general search query answers 454, such as answers to frequently searched topics. Additionally, the inputs include answer card rankings 456 that score, order, and rank the candidate answer cards. In some implementations, the answer card rankings 456 include criteria for determining the rank of matched answer cards. In various implementations, each topic has its own set of inputs.

Furthermore, the inputs include add-on queries 458. In various implementations, an add-on query is a related query to a given query. For example, for the search query "What is the best time to visit Hawaii," add-on queries may include "the worst time to visit," "most popular island in Hawaii," "humpback whales in Hawaii," and "surfing in Hawaii. In some implementations, the add-on queries are associated with a topic section rather than the whole generative document.

As shown, the generative document system 206 also provides the answer card correlation prompt 126 and the unformatted generative search results document 118 to the large generative model 230. As described above, the answer card correlation prompt 126 instructs the large generative model 230 to generate answer card matches for topic sections 460.

FIG. 4B includes a visual example of answer card matches for topic sections 460. As shown, the topic sections are labeled (e.g., Doc_Topic_Section_N) and the generative document system 206 adds corresponding answer card matches to each section. For example, the first topic includes two answer cards, including a BestTimeToVisitCard and an ImageAnswer card. Notably, in the illustrated implementation, the large generative model 230 matched different answer cards to the different topics to prevent the same answer card from being displayed in different sections. In some implementations, an answer card is included in different sections.

In various implementations, the large generative model 230 may indicate particular strings of text that correspond to a particular answer card. In these implementations, the large generative model 230 may indicate the string to which an answer card belongs.

Figure 5A:
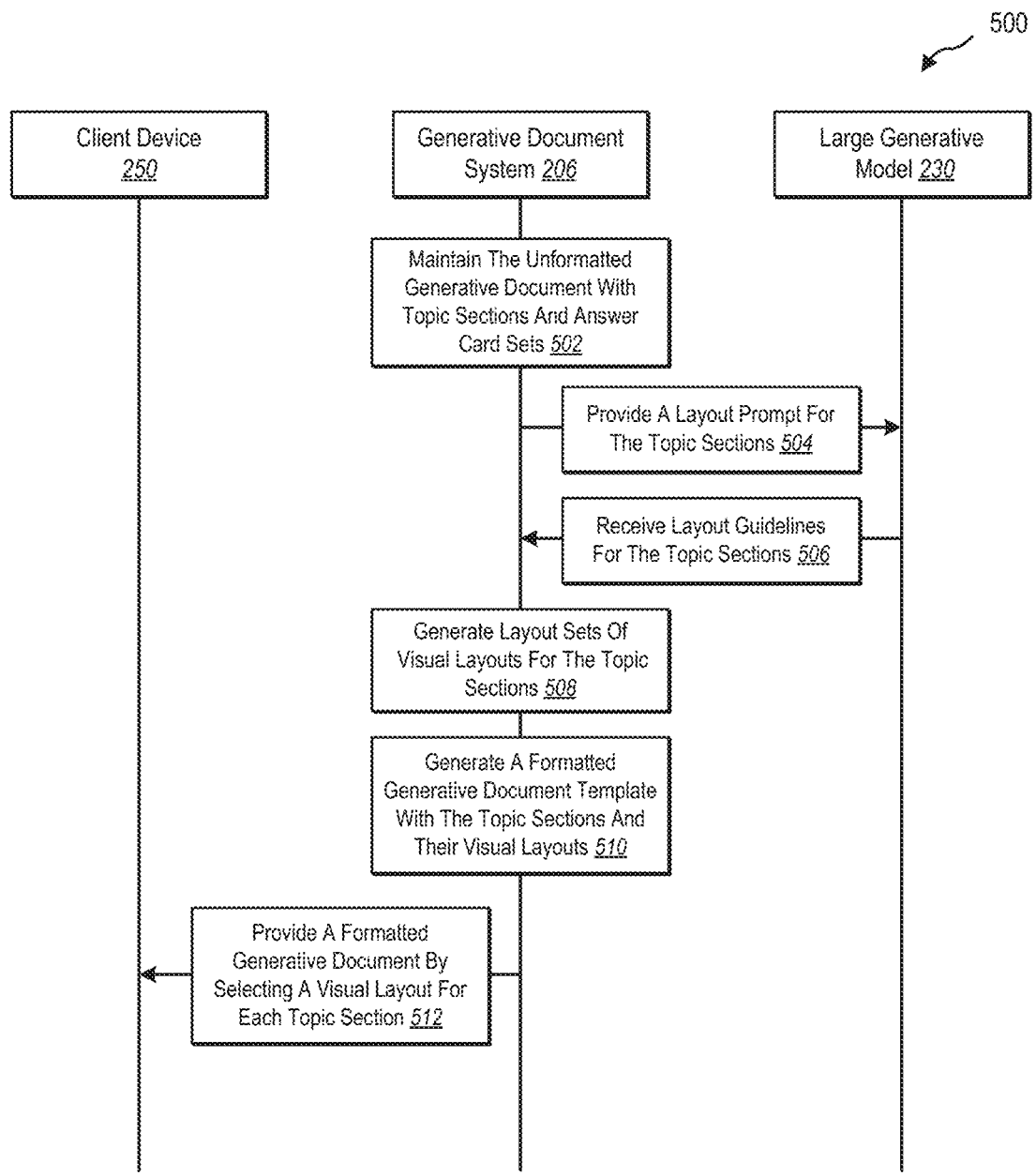
FIG. 5A illustrates an example sequence diagram of using a large generative model to determine layout guidelines.

FIG. 5A illustrates an example sequence diagram of using a large generative model to determine layout guidelines according to some implementations. As shown, FIG. 5A includes a series of acts 500 performed by or with the generative document system 206. In some implementations, the series of acts 500 may include fewer or different acts (e.g., some of the acts may be skipped or omitted). Additionally, in some instances, the acts in the series of acts 500 are performed in a different order.

As shown, the series of acts 500 begins with act 502 of the generative document system 206 maintaining the unformatted generative document with topic sections and answer card lists. As previously described in connection with FIG. 4A, the generative document system 206 generates the unformatted generative document with topic sections and answer card lists using the large generative model 230. In some instances, the series of acts 500 omits act 502.

Act 504 includes the generative document system 206 providing a layout prompt for the topic sections to the large generative model 230. For example, the generative document system 206 instructs the large generative model 230 in the generated layout prompt to generate layout guidelines for each topic section that provide suggestions for visually pairing text narrative responses with matching answer cards. In some implementations, the layout guidelines indicate which answer cards should be associated with portions of text within a text narrative response of a topic section. In various implementations, the layout guidelines provide logical ordering, grouping type, and positioning for topic sections. Additionally, in some implementations, the layout guidelines are ranked based on priority and/or importance.

In some implementations, the generative document system 206 provides a set or list of layout templates to the large generative model 230 along with the generated layout prompt. The generated layout prompt instructs the large generative model 230 to generate layout guidelines for each topic section that adheres to the layout templates. In some implementations, the layout guidelines suggest which types of visual arrangements work best for the content. For example, if a topic section is comparing items, the layout guidelines recommend a column-based arrangement for placing different portions of the text narrative response and their corresponding answer cards (e.g., images of the items) in their own column. As another example, if a topic section is providing information, the layout guidelines suggest the types of answer cards that should be used to optimize flow and readability.

Act 506 shows the generative document system 206 receiving layout suggestions for the topic sections from the large generative model 230. In some instances, the layout guidelines are provided separately based on separate calls to the large generative model 230. In some implementations, the layout guidelines for all the topic sections in a generative document are provided together.

In various implementations, the layout guidelines do not include visual arrangement instructions. More particularly, while the layout guidelines recommend which answer cards work best with portions of a topic section, the layout guidelines do not provide grid placement or coordinate suggestions for the exact placement of answer cards within a topic section. However, in some implementations, the layout guidelines may also include suggested template layouts for one or more topic sections.

In implementations where the layout guidelines do not provide visual arrangements, the generative document system 206 generates layout lists of visual layouts for the topic sections, as shown in act 508. For example, the generative document system 206 utilizes a layout output generator that determines visual layout arrangements for each topic section by pairing the text narrative response with a combination of matching answer cards according to the layout guidelines. By following the layout guidelines, the generative document system 206 combines the content of a topic section with one or more corresponding answer cards in the most logical manner.

In some implementations, answer cards have multiple available grid size or dimension options. In these implementations, the generative document system 206 considers each available size when generating template layouts. Along with dimension sizes, the generative document system 206 also considers the different content and/or answer granularity within the different versions of an answer card. In various implementations, the generative document system 206 generates multiple template layouts in parallel.

The generative document system 206 can generate multiple layout templates for each topic section. For example, the generative document system 206 generates different layout options that include different combinations of answer cards (or versions of answer cards) selected from the answer cards previously matched to the section by the large generative model 230. In various implementations, each layout option follows the same grid width but can vary in height based on the combinations of answer cards included in the layout option. In some implementations, the generative document system 206 generates template layouts for multiple topic sections in parallel.

In various implementations, the generative document system 206 ranks or orders the layout options for each topic section. Additionally, the generative document system 206 may store a limited number of layout options for each section. In some implementations, the generative document system 206 also stores a failsafe or fallback layout option that includes the text narrative response without any answer cards.

In many implementations, the generative document system 206 stores answer card placeholders in each layout option rather than the answer card itself. The placeholder may block out the dimensions and placement of the answer card within the layout option. However, the generative document system 206 does not need to store the content of the answer card, which saves on memory and storage. Furthermore, the placeholder allows the generative document system 206 to dynamically populate the answer card with the most current information when the layout option is selected to be used when creating a new generative document to provide to a client device.

Act 510 includes the generative document system 206 generating a formatted generative document template with topic sections and their visual layouts. For example, the generative document system 206 aggregates or builds one or more of the layout options for each topic section into a formatted generative document template, where each layout option provides a visual arrangement of content including text narrative responses and answer cards. Using this formatted template for the search query, the generative document system 206 can quickly create a formatted generative document.

To illustrate, act 512 includes the generative document system 206 providing a formatted generative document to the client device 250 by selecting a visual layout for each topic section. For example, the generative document system 206 selects the top-ranked layout option for each topic section, populates the layout option with the corresponding answer cards, and provides the formatted generative document to the client device 250 in response to the search query.

In some implementations, one or more answer cards may be unavailable within a visual layout. For example, the visual layout references an image, which returns an error message when accessed. In these implementations, the generative document system 206 selects another layout option for the topic section, such as the next highest-ranked layout. This way, the generative document system 206 quickly and dynamically creates the generative document.

Figure 5B:
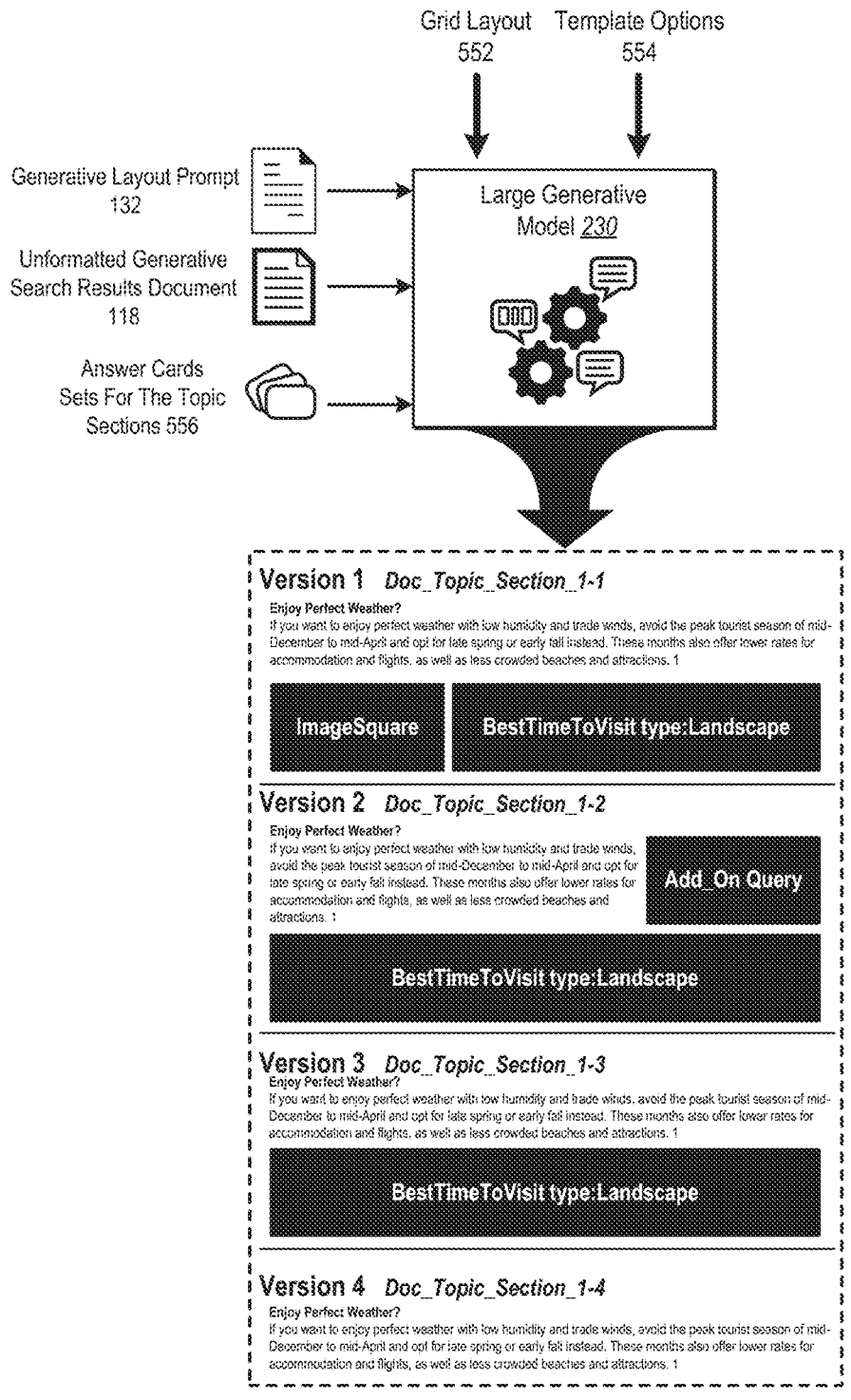
FIG. 5B illustrates an example of generating topic section layouts.

FIG. 5B illustrates an example of generating topic section layouts according to some implementations. FIG. 5B provides examples of various elements and outputs corresponding to the generation of an unformatted generative document. As shown, FIG. 5B includes a series of acts 550 performed by the generative document system 206 to answer card matches using the large generative model 230.

The series of acts 550 in FIG. 5B includes the generative document system 206 providing various versions of the grid layout 552 and template options 554 to the large generative model 230. In various implementations, the grid layout 552 includes available sizes and/or dimensions for the overall formatted generative document. The template options 554 provide various arrangement options for topic sections. For example, the template options 554 provide different content arrangements across rows and columns within a topic section.

Additionally, the generative document system 206 provides the generated layout prompt 132, the unformatted generative search results document 118, and answer card lists for the topic sections 556 to the large generative model 230. The generated layout prompt 132 instructs the large generative model 230 to generate topic guidelines for each topic section based on the inputs, as described above.

As mentioned earlier, in some implementations, the large generative model 230 generates layout guidelines for each topic section, which the generative document system 206 uses to generate layout options. In some implementations, the large generative model 230 may directly generate the layout options. In either case, the large generative model 230 uses the previous LGM outputs in an aggregated way to generate the layout guidelines (e.g., the aggregated framework includes providing the unformatted generative search results document 118 and the topic sections 556 back to the large generative model 230).

As shown, the series of acts 550 results in the generative document system 206 generating layout options for a topic section 558. The generative-based layout options shown are all for the same topic section; however, each version has a different combination of answer cards. In particular, the first three versions include a common answer card, but the other answer cards differ. Furthermore, the last version is the fallback option that does not include any answer cards to ensure that the topic section is displayed even if answer cards in other layout options are unavailable.

Figure 6:
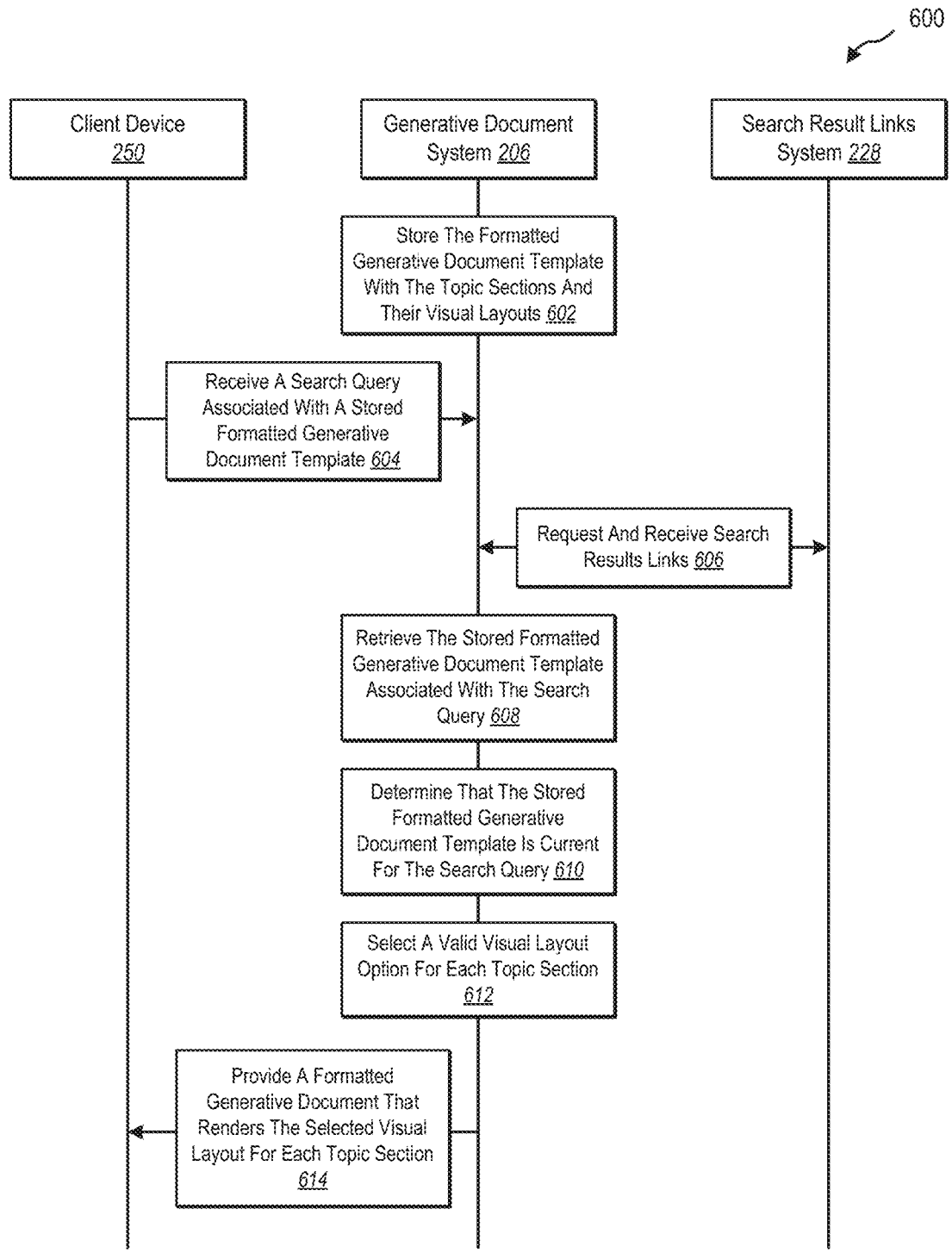
FIG. 6 illustrates an example sequence diagram of providing a formatted generative document for a previously searched query.
Figure 7:
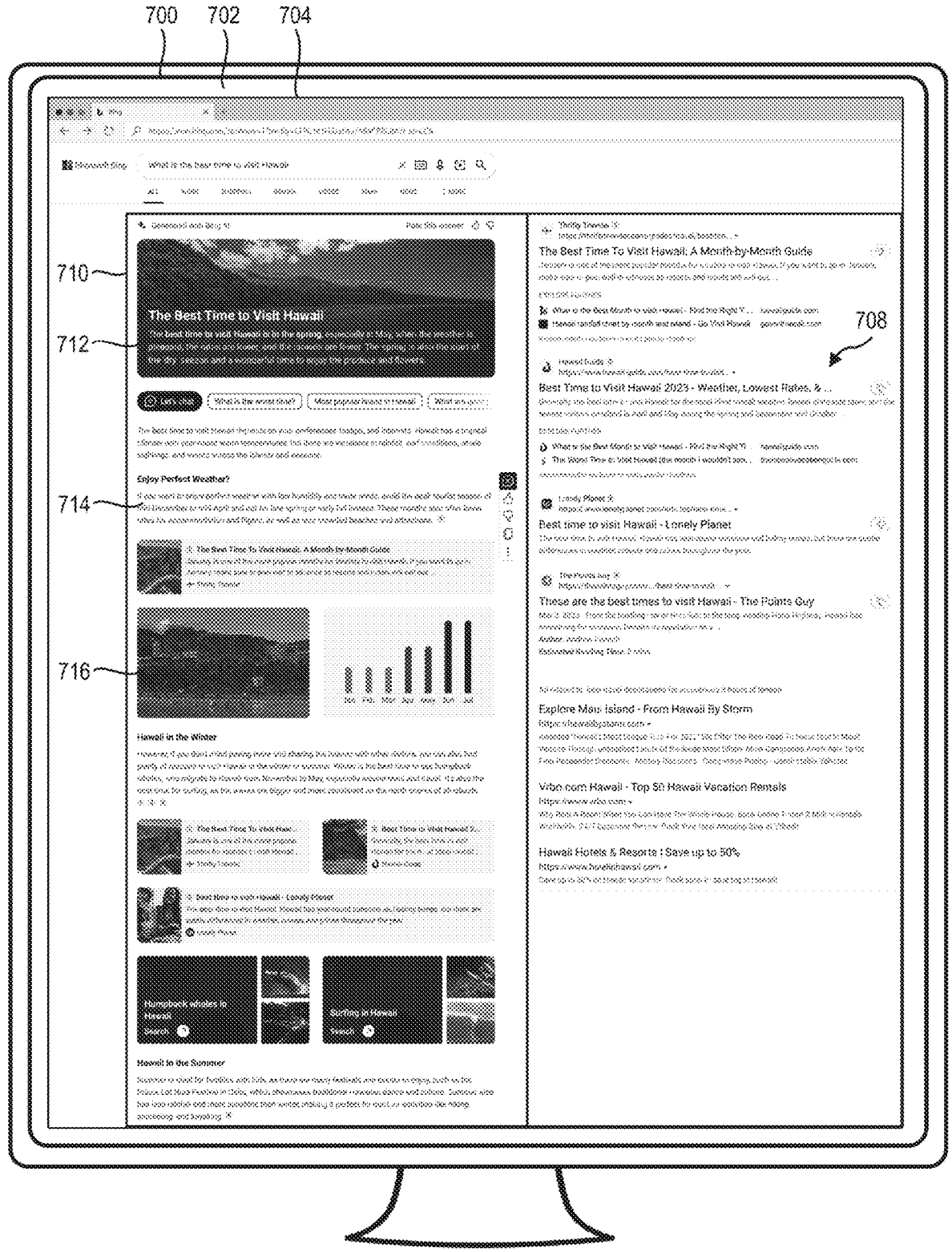
FIG. 7 illustrates an example graphical user interface of a generative search results document.

FIG. 6 illustrates an example sequence diagram of providing a formatted generative document for a previously searched query according to some implementations. As shown, FIG. 6 includes a series of acts 600 performed by or with the generative document system 206. In some implementations, the series of acts 600 may include fewer or different acts (e.g., some of the acts may be skipped or omitted). Additionally, in some instances, the acts in the series of acts 600 are performed in a different order.

Act 602 shows the generative document system 206 storing the formatted generative document template with the topic sections and their visual layouts. For example, in connection with providing a formatted generative document to the client device 250, the generative document system 206 stores or caches the formatted generative document template in a data store for future retrieval. In particular, the generative document system 206 stores a formatted generative document template for a search query that includes one or more visual layout options for each of the topic sections.

In some instances, the generative document system 206 generates and stores formatted generative document templates based on previous or historical searches. For instance, the generative document system 206 searches through query logs to identify frequently requested search queries. For identified queries, the generative document system 206 generates and stores formatted generative document templates.

Act 604 shows the generative document system 206 receiving a search query associated with a stored formatted generative document template from a client device 250. For example, a user associated with the client device 250 requests the same or a similar search query that corresponds to the stored formatted generative document template. The search query may be re-requested by a previous user or newly requested by a new user.

Act 606 shows the generative document system 206 requesting and receiving search result links. For instance, as described earlier, the generative document system 206 obtains a set of results links from the search result links system 228 for the search request. As described above in act 302 and act 304 of FIG. 3A, the set of search result links may be ordered or ranked based on a search result score.

Act 608 shows the generative document system 206 retrieving the stored formatted generative document template associated with the search query. For example, when a search query is received, the generative document system 206 checks the data store for a cached version of the formatted generative document template for a search result. Act 608 may be performed before, after, or concurrently with act 606.

Act 610 shows the generative document system 206 determining that the formatted generative document template is current for the search query. In various implementations, the generative document system 206 verifies the freshness of the formatted generative document template before determining or deciding whether to use the template to respond to the search result. If the formatted generative document template is not current, the generative document system 206 may generate and store a new template for the search query.

In various implementations, the generative document system 206 determines whether a formatted generative document template is current based on age or creation date (or a last modified date). For example, the generative document system 206 verifies whether the template is less than a threshold age. In some implementations, the threshold age depends on the subject matter of the search results, allowing more historical topics to have older ages before being considered out-of-date.

In some implementations, the generative document system 206 determines whether a formatted generative document template is current by comparing the search result links associated with the stored formatted generative document template with the newly obtained search result links. For instance, the generative document system 206 determines whether a threshold amount (e.g., number or percent) of links and/or external real-time signals (e.g., news, stock tickers, weather) match between the stored set and the newly received set.

To illustrate, in one or more implementations, the generative document system 206 compares the top n results in each set to determine a freshness match. For example, the generative document system 206 determines that the top 3 (or 5, 10, 25, etc.) results match between the two sets. In one instance, the generative document system 206 requires an exact match. In some instances, the generative document system 206 also determines a number or percentage match, such as a 3 out of the top 5 links (or another set of numbers) match.

In some implementations, the generative document system 206 also determines whether the order of the search result links has changed between the stored and new sets of search result links. For example, if the new search result links have a new order or ranking of links, the generative document system 206 determines that the stored formatted generative document template is outdated.

In various implementations, the generative document system 206 compares whether the search result links have changed between the stored and new sets of search result links using a freshness algorithm. For example, the generative document system 206 generates a hash from the top n results (e.g., the top 3, 5, 8, or 10) of each set of search result links to generate a freshness value based on which links are included in the set and their rank or order. The generative document system 206 then compares the freshness values between the stored and new sets of search result links to determine a match. In some instances, the freshness algorithm is a fuzzy algorithm that allows for small changes between the two sets (e.g., the same links with a different order).

By using a freshness value, the generative document system 206 may store the formatted generative document template without storing the set of search result links, which saves on computing resources. For example, when storing a formatted generative document template of a search query, the freshness value for the formatted generative document template is associated with the search query. Then, when the search query is searched again by a client device, the generative document system 206 needs only to compare the current freshness value of the search result with the stored freshness value to determine a match. In some implementations, the generative document system 206 verifies its freshness before retrieving a stored formatted generative document template from a data store, which saves on bandwidth.

If the formatted generative document template is current or fresh, the generative document system 206 uses it to provide a formatted generative document in response to the search query. Otherwise, the generative document system 206 generates a new formatted generative document template. To illustrate, act 612 shows the generative document system 206 selecting a valid visual layout for each topic section from its layout list.

In particular, act 612 includes the generative document system 206 generating a validly formatted generative document from the stored formatted generative document template. For example, for a topic section, the generative document system 206 identifies the first listed or top-ranked visual layout option. For answer card placeholders within the visual layout option, the generative document system 206 verifies that the resources associated with the placeholder are still available (e.g., an image placeholder links to a valid image file). If so, the generative document system 206 selects that visual layout option for the topic section.

If an answer card within a visual layout option is not available, the generative document system 206 moves to the second listed (or next highest ranked) visual layout option and repeats the above verification process until a valid visual layout option is selected for the topic section. If needed, the generative document system 206 selects the failsafe or fallback visual layout option with no answer cards. By moving to the next visual layout option when verification of a higher rank fails, the generative document system 206 quickly and efficiently determines a visual layout option to select for each topic section.

Upon selecting visual layout options for each topic section, the generative document system 206 renders each section to dynamically generate a formatted generative document for the search query. The generative document system 206 then provides it to the client device 250 in response to the search query. To illustrate, act 614 shows the generative document system 206 providing a formatted generative document to the client device 250 that renders the selected visual layout for each topic section.

In various implementations, the generative document system 206 provides the newly created formatted generative document with the newly retrieved set of search result links. For example, the generative document cites one or more of the search result links. If the order of the search result links has changed, the generative document system 206 may cause the set of search result links to be reordered to match the generative document and/or update the number in the topic sections to match the new search result link ordering.

FIG. 7 illustrates an example graphical user interface that provides a generative document along with a set of search result links based on a search query, according to some implementations. As shown, FIG. 7 includes a client device 700 with a graphical user interface 702 and a client application 704. The client application 704 allows a user to interact with the image generation system to receive a generative document for a search query. For instance, the client application 704 can be a web browser that enables a user to submit search queries.

As shown, the client application 704 displays the results of a search request, which includes a generative document 710 that corresponds to a set of search result links 708. In this example, the generative document 710 and the set of search result links 708 are included within a SERP. In some implementations, the SERP only includes the generative document 710. For example, the set of search result links 708 may be omitted, located on another page, or selectively appear based on user interaction with corresponding elements of the generative document.

The generative document 710 includes a header section 712 at the top. In some implementations, the header section includes interactive links to topic sections 714 provided in the generative document 710. In various implementations, the generative document system 206 considers the header section 712 as the first topic section of a generative document.

As shown, the topic sections 714 include text narrative responses that provide plain language descriptions of the set of search result links, sorted by topic. In particular, the text narrative responses include citation numbers that link to corresponding numbers shown within the set of search result links 708. In some implementations, a topic section provides a first level of detail along with an option to further explore the topic. If the option is selected, the topic section expands to display additional content.

The topic sections 714 also include answer cards 716. Answer cards may include images, graphics, text, and/or links. In some instances, an answer card includes an add-on query. In some instances, an answer card also links to one or more of the set of search result links 708.

As stated, the generative document 710 serves as a carefully curated document based on the set of search result links 708, which are built by leveraging large generative models. The generative document 710 facilitates quick comprehension of the set of search result links 708 in a narrative and interactive form. When the set of search result links 708 change over time, the generative document system 206 likewise updates the generative document 710 to remain accurate and current.

Figure 8:
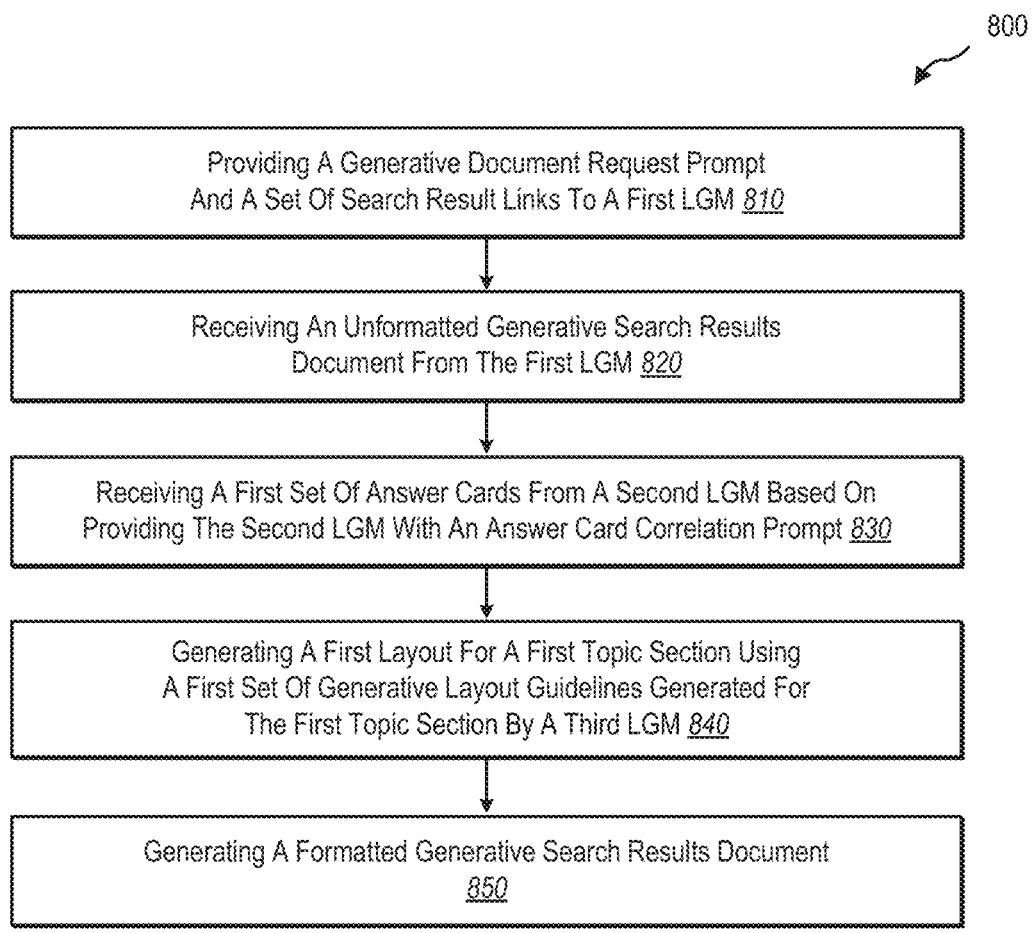
FIG. 8 illustrates an example series of acts of a computer-implemented method for using one or more large generative models to generate a generative search results document.

Turning now to FIG. 8, this figure illustrates an example series of acts of a computer-implemented method for generating search result documents using large generative models (LGMs) according to some implementations. While FIG. 8 illustrates acts according to one or more implementations, alternative implementations may omit, add to, reorder, and/or modify any of the acts shown.

The acts in FIG. 8 can be performed as part of a method (e.g., a computer-implemented method). Alternatively, a computer-readable medium can include instructions that, when executed by a processing system with a processor, cause a computing device to perform the acts in FIG. 8. In some implementations, a system (e.g., a processing system comprising a processor) can perform the acts in FIG. 8. For example, the system includes a processing system and a computer memory including instructions that, when executed by the processing system, cause the system to perform various actions or steps.

As shown, the series of acts 800 includes act 810 of providing a generative document request prompt and a set of search result links to a first LGM. For instance, in example implementations, act 810 involves providing a generative document request prompt and a set of search result links to a first LGM, where the set of search result links is based on a search query. In some implementations, act 810 includes receiving the search query from a client device associated with a user, providing the search query to a search query system, and receiving the set of search result links from the search query system. In some implementations, act 810 includes providing the set of search result links to an LGM with a search intent prompt, receiving a set of potential search intents from the LGM; selecting a search intent from the set of potential search intents; and providing the search intent, a generative document request prompt, and the set of search result links to the first LGM.

As further shown, the series of acts 800 includes act 820 of receiving an unformatted generative search results document from the first LGM. For instance, in example implementations, act 820 involves receiving an unformatted generative search results document from the first LGM having a first topic section and a second topic section where each of the first and second topic sections correlates topic-specific text narrative responses with search result links from the set of search result links. In some implementations, the determination of the first topic section and the second topic section (e.g., the first LGM determines the first topic section and the second topic section) is based on analyzing or processing the set of search result links; the first topic section includes the first text narrative response corresponding to a first subset of the search result links; and/or the second topic section includes a second text narrative response corresponding to a second subset of the search result links, the first subset differs/being different from the second subset.

As further shown, the series of acts 800 includes act 830 of receiving a first set or list of answer cards from a second LGM based on providing the second LGM with an answer card correlation prompt. For instance, in example implementations, act 830 involves receiving a first set or list of answer cards from a second LGM based on providing the second LGM with an answer card correlation prompt, the first topic section, and a set of candidate answer cards associated with the first topic section, where the first set or list of answer cards correlates a first text narrative response for the first topic section to answer cards within the set of candidate answer cards. In some implementations, act 830 includes providing a first answer card query for the first topic section to an answer card system, and receiving the set of candidate answer cards associated with the first topic section from the answer card system. In some implementations, the first set or list of answer cards from the second LGM includes the available dimensions of answer cards for each answer card within the first set or list of answer cards.

As shown further, the series of acts 800 includes act 840 of generating a first layout for a first topic section using a first set or list of generative layout guidelines generated for the first topic section by a third LGM. For instance, in example implementations, act 840 involves generating a first layout for the first topic section using a first set or list of generative layout guidelines generated for the first topic section by a third LGM based on providing the third LGM with a generative layout prompt, where the first layout visually positions the first text narrative response with a first combination of answer cards from the first set or list of answer cards.

In some implementations, act 840 includes generating an additional layout for the first topic section using the first set or list of generative layout guidelines, where the additional layout visually positions the first text narrative response with a second combination of answer cards from the first set or list of answer cards that differs from the first combination of answer cards. In some implementations, act 840 also includes generating a fallback layout for the first topic section that displays the first text narrative response without any answer cards from the first set or list of answer cards. In some implementations, at least two of the first LGM, the second LGM, and the third LGM are the same.

In some instances, in connection with act 840, the first set or list of generative layout guidelines provides a ranked layout order between portions of a text narrative response in the first topic section and combinations of answer cards from the first set or list of answer cards. In some implementations, the first topic section is divided into a grid with an adjustable height, and/or the first layout is generated based on the available dimensions of the answer cards within the first set or list of answer cards.

As further shown, the series of acts 800 includes act 850 of generating a formatted generative search results document. For instance, in example implementations, act 850 involves generating a formatted generative search results document that includes the first layout for the first topic section and a second layout generated for the second topic section. In some implementations, act 850 includes providing the formatted generative search results document adjacent to the set of search result links to a client device in response to the search query, where the formatted generative search results document is generated based on the set of search result links. In some implementations, act 850 also includes modifying a ranked order of the set of search result links to prioritize search result links cited in the formatted generative search results document.

In some implementations, act 850 includes storing the formatted generative search results document; receiving an additional instance of the search query; comparing an additional set of search result links associated with the additional instance of the search query with the set of search result links associated with the search query; and/or providing the formatted generative search results document from storage in response to the additional instance of the search query based on the additional set of search result links and the set of search result links meeting a correlation threshold. In some implementations, act 850 also includes comparing the additional set of search result links with the set of search result links by selecting a number of search links as the correlation threshold and matching, the number of search links between the additional set of search result links and the set of search result links in ranked order.

In some implementations, act 850 includes storing the formatted generative search results document; receiving an additional instance of the search query; determining that the ranked order of one or more links from an additional set of search result links associated with the additional instance of the search query does not match the search result links; and generating an updated formatted generative search results document based on the additional set of search result links. In some implementations, act 850 also includes storing the formatted generative search results document, including storing multiple layouts for the first topic section. In some implementations, act 850 includes retrieving a stored version of the formatted generative search results document in response to receiving an additional instance of the search query; determining that an answer card in the first layout of the first topic section is unavailable or faulty; and providing the formatted generative search results document with the additional layout for the first topic section in response to the additional instance of the search query.

In some instances, the series of acts 800 includes (or is replaced by) receiving an unformatted generative search results document from a first LGM having topic sections with topic-specific text narrative responses determined from a set of search result links corresponding to a search query; receiving a set or list of answer cards for a topic section from the topic sections in response to providing a second LGM with an answer card correlation prompt, a text narrative response from the topic section, and a set of candidate answer cards associated with the topic section; generating multiple layouts for the topic section using a set or list of generative layout guidelines generated for the topic section by a third LGM based on providing the third LGM with a generative layout prompt, where the multiple layouts visually position the text narrative response with different combinations of answer cards from the set or list of answer cards; and generating a formatted generative search results document that includes a layout from the multiple layouts for the topic section.

In some instances, the series of acts 800 includes (or is replaced by) providing a generative document request prompt and a set of search result links to an LGM (e.g., a fourth LGM), where the set of search result links is based on a search query; receiving an unformatted generative search results document from the LGM having a first topic section and a second topic section that each correlates topic-specific text narrative responses with search result links from the set of search result links; receiving a first set or list of answer cards from the LGM based on providing the LGM with an answer card correlation prompt, the first topic section, and a set of candidate answer cards associated with the first topic section, where the first set or list of answer cards correlates a first text narrative response for the first topic section to answer cards within the set of candidate answer cards; generating a first layout for the first topic section using a first set or list of generative layout guidelines generated for the first topic section by the LGM based on providing the LGM with a generative layout prompt, where the first layout visually positions the first text narrative response with a first combination of answer cards from the first set or list of answer cards; and generating a formatted generative search results document that includes the first layout for the first topic section and a second layout generated for the second topic section.

Figure 9:
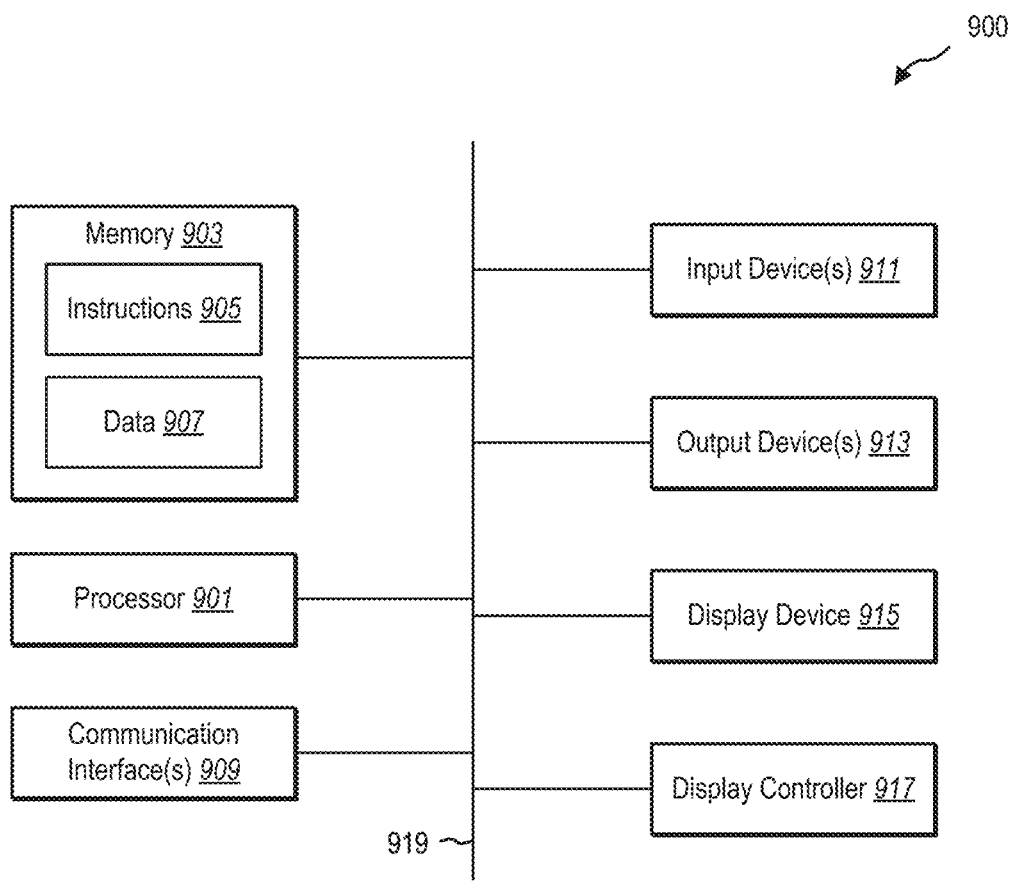
FIG. 9 illustrates example components included within a computer system used to implement the generative document system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface (s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating a search results document using large generative models (LGMs), comprising:
    providing a generative document request prompt and a set of search result links to a first LGM, wherein the set of search result links is based on a search query;
    receiving an unformatted generative search results document, from the first LGM, having a first topic section and a second topic section, each of the first topic section and the second topic section correlates topic-specific text narrative responses with search result links from the set of search result links, wherein the first topic section is different from the second topic section;
    receiving a first set of answer cards from a second LGM based on providing the second LGM with an answer card correlation prompt, the first topic section, and a set of candidate answer cards associated with the first topic section, wherein the first set of answer cards correlates a first text narrative response for the first topic section to answer cards within the set of candidate answer cards;
    generating a first layout for the first topic section using a first set of generative layout guidelines generated for the first topic section by a third LGM based on providing the third LGM with a first generative layout prompt, wherein the first layout visually positions the first text narrative response with a first combination of answer cards from the first set of answer cards;
    generating a second layout for the second topic section using a second set of generative layout guidelines generated for the second topic section by a fourth LGM based on providing the fourth LGM with a second generative layout prompt, wherein the second layout visually positions a second text narrative response for the second topic section with a second combination of answer cards from a second set of answer cards generated for the second topic section, wherein the first set of answer cards differs from the second set of answer cards, and wherein the first layout differs from the second layout; and
    generating a formatted generative search results document that includes the first layout for the first topic section and the second layout for the second topic section.

2. The computer-implemented method of claim 1, wherein:
    determining the first topic section and the second topic section is based on analyzing the set of search result links;
    the first topic section includes the first text narrative response corresponding to a first subset of the search result links; and
    the second topic section includes the second text narrative response corresponding to a second subset of the search result links, the first subset being different from the second subset.

3. The computer-implemented method of claim 1, further comprising:
    providing a first answer card query for the first topic section to an answer card system; and
    receiving the set of candidate answer cards associated with the first topic section from the answer card system.

4. The computer-implemented method of claim 1, wherein the first set of generative layout guidelines provides a ranked layout order between portions of a text narrative response in the first topic section and combinations of answer cards from the first set of answer cards.

5. The computer-implemented method of claim 1, wherein the first set of answer cards from the second LGM includes available dimensions of answer cards for each answer card within the first set of answer cards.

6. The computer-implemented method of claim 5, wherein:
    the first topic section is divided into a grid with an adjustable height; and
    generating the first layout is based on the available dimensions of the answer cards within the first set of answer cards.

7. The computer-implemented method of claim 1, further comprising providing the formatted generative search results document adjacent to the set of search result links to a client device in response to the search query, wherein the formatted generative search results document is generated based on the set of search result links.

8. The computer-implemented method of claim 1, further comprising modifying a ranked order of the set of search result links to prioritize search result links cited in the formatted generative search results document.

9. The computer-implemented method of claim 8, further comprising:
    storing the formatted generative search results document;
    receiving an additional instance of the search query;
    comparing an additional set of search result links associated with the additional instance of the search query with the set of search result links associated with the search query; and
    based on the additional set of search result links and the set of search result links meeting a correlation threshold, providing the formatted generative search results document from storage in response to the additional instance of the search query.

10. The computer-implemented method of claim 9, further comprising comparing the additional set of search result links with the set of search result links by:
    selecting a number of search links as the correlation threshold; and matching, in ranked order, the number of search links between the additional set of search result links and the set of search result links.

11. The computer-implemented method of claim 8, further comprising:
storing the formatted generative search results document;
receiving an additional instance of the search query;
determining that a ranked order of one or more links from an additional set of search result links associated with the additional instance of the search query does not match the search result links; and
generating an updated formatted generative search results document based on the additional set of search result links.

12. The computer-implemented method of claim 11, further comprising storing the formatted generative search results document, including storing multiple layouts for the first topic section.

13. The computer-implemented method of claim 1, wherein at least two of the first LGM, the second LGM, the third LGM, and the fourth LGM are a same LGM.

14. A system for generating a search results document using large generative models (LGMs), comprising:
a processing system; and
a computer memory comprising instructions that, when executed by the processing system, cause the system to perform operations of:
receiving an unformatted generative search results document from a first LGM having topic sections with topic-specific text narrative responses determined from a set of search result links corresponding to a search query;
receiving a set of answer cards for a topic section from the topic sections in response to providing a second LGM with an answer card correlation prompt, a text narrative response from the topic section, and a set of candidate answer cards associated with the topic section;
generating multiple layouts for the topic section using a set of generative layout guidelines generated for the topic section by a third LGM based on providing the third LGM with a generative layout prompt, wherein the multiple layouts visually position the text narrative response with different combinations of answer cards from the set of answer cards;
generating additional multiple layouts for an additional topic section using an additional set of generative layout guidelines generated for the additional topic section by a fourth LGM based on providing the fourth LGM with an additional generative layout prompt, wherein the additional multiple layouts are different from the multiple layouts; and
generating a formatted generative search results document that includes a layout from the multiple layouts for the topic section and the additional multiple layouts for the additional topic section.

15. The system of claim 14, wherein the operations further comprise:
receiving the search query from a client device associated with a user;
providing the search query to a search query system; and
receiving the set of search result links from the search query system.

16. The system of claim 15, wherein the operations further comprise:
providing the set of search result links to a fourth LGM with a search intent prompt;
receiving a set of potential search intents from the fourth LGM;
selecting a search intent from the set of potential search intents; and
providing the search intent, a generative document request prompt, and the set of search result links to the first LGM.

17. A computer-implemented method for generating a search result document using large generative models (LGMs), comprising:
providing a generative document request prompt and a set of search result links to an LGM, wherein the set of search result links is based on a search query;
receiving an unformatted generative search results document from the LGM having a first topic section and a second topic section that each correlates topic-specific text narrative responses with search result links from the set of search result links;
receiving a first set of answer cards from the LGM based on providing the LGM with an answer card correlation prompt, the first topic section, and a set of candidate answer cards associated with the first topic section, wherein the first set of answer cards correlates a first text narrative response for the first topic section to answer cards within the set of candidate answer cards;
generating a first layout for the first topic section using a first set of generative layout guidelines generated for the first topic section by the LGM based on providing the LGM with a first generative layout prompt, wherein the first layout visually positions the first text narrative response with a first combination of answer cards from the first set of answer cards;
generating a second layout for the second topic section using a second set of generative layout guidelines generated for the second topic section by the LGM based on providing the LGM with a second generative layout prompt, wherein the first layout differs from the second layout; and
generating a formatted generative search results document that includes the first layout for the first topic section and a second layout generated for the second topic section.

18. The computer-implemented method of claim 17, further comprising generating an additional layout for the first topic section using the first set of generative layout guidelines, wherein the additional layout visually positions the first text narrative response with a second combination of answer cards from the first set of answer cards that differs from the first combination of answer cards.

19. The computer-implemented method of claim 18, further comprising:
retrieving a stored version of the formatted generative search results document in response to receiving an additional instance of the search query;
determining that an answer card in the first layout of the first topic section is unavailable; and
providing the formatted generative search results document with the additional layout for the first topic section in response to the additional instance of the search query.

20. The computer-implemented method of claim 18, further comprising generating a fallback layout for the first topic section that displays the first text narrative response without any answer cards from the first set of answer cards.

* * * * *